US010960457B2

(12) United States Patent
Kawasaki et al.

(10) Patent No.: US 10,960,457 B2
(45) Date of Patent: Mar. 30, 2021

(54) RIVET BONDING MOLD

(71) Applicant: MAZDA MOTOR CORPORATION, Hiroshima (JP)

(72) Inventors: Yoshihiro Kawasaki, Hiroshima (JP); Noboru Shimizu, Hiroshima (JP); Ryotaro Hirata, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 13 days.

(21) Appl. No.: 16/604,925

(22) PCT Filed: Apr. 16, 2018

(86) PCT No.: PCT/JP2018/015698
§ 371 (c)(1),
(2) Date: Oct. 11, 2019

(87) PCT Pub. No.: WO2018/194021
PCT Pub. Date: Oct. 25, 2018

(65) Prior Publication Data
US 2020/0156143 A1    May 21, 2020

(30) Foreign Application Priority Data

Apr. 17, 2017  (JP) .............................. JP2017-081221
Apr. 17, 2017  (JP) .............................. JP2017-081224

(51) Int. Cl.
*B21J 15/02*     (2006.01)
*B21J 15/36*     (2006.01)
(Continued)

(52) U.S. Cl.
CPC ............. *B21J 15/025* (2013.01); *B21J 15/36* (2013.01); *B21D 39/031* (2013.01);
(Continued)

(58) Field of Classification Search
CPC ........ B21J 15/025; B21J 15/046; B21J 15/36; B21J 15/40; B21D 39/031–032;
(Continued)

(56) References Cited

U.S. PATENT DOCUMENTS 4,713,872 A    12/1987 Muller
5,056,207 A    10/1991 Ladouceur
(Continued)

FOREIGN PATENT DOCUMENTS

CN    1607983 A    4/2005
CN    102483084 A   5/2012
(Continued)

OTHER PUBLICATIONS

International Search Report issued in PCT/JP2018/015698; dated May 29, 2018.

*Primary Examiner* — Matthew P Travers
(74) *Attorney, Agent, or Firm* — Studebaker & Brackett PC

(57) ABSTRACT

A cavity (20) provided for a die body (2) at one side thereof in an axial direction includes a cavity bottom surface (21), on which a protrusion (40) jutting toward the one side in the axial direction is formed. A tip end face (41) of the protrusion (40) is configured as a flat surface extending in a direction substantially orthogonal to the axial direction and having a predetermined width (W1) in a radial direction. The predetermined width (W1) of the tip end face (41) is set to be 10% or more of a diameter (Di1) of the cavity (20) at an open end thereof.

7 Claims, 18 Drawing Sheets

(51) Int. Cl.
*F16B 5/04* (2006.01)
*F16B 19/08* (2006.01)
*B21D 39/03* (2006.01)
*B29C 65/00* (2006.01)

(52) U.S. Cl.
CPC ............. *B29C 66/8322* (2013.01); *F16B 5/04* (2013.01); *F16B 19/086* (2013.01)

(58) Field of Classification Search
CPC ........ F16B 5/04; F16B 19/086; F16B 37/062; F16B 37/065; F16B 37/068
See application file for complete search history.

(56) References Cited

U.S. PATENT DOCUMENTS

| | | |
|---|---|---|
| 5,174,018 A | 12/1992 | Muller |
| 6,722,013 B1 | 4/2004 | Rapp |
| 7,287,944 B2 * | 10/2007 | Ladouceur ............ B23P 19/062 29/512 |
| 7,380,326 B2 * | 6/2008 | Kovac ................... B23P 19/062 29/505 |
| 2004/0010903 A1 | 1/2004 | Edwards |
| 2005/0019137 A1 | 1/2005 | Iwatsuki et al. |
| 2012/0180305 A1 | 7/2012 | Bartig |
| 2015/0121679 A1 | 5/2015 | Bartig et al. |
| 2015/0183022 A1 | 7/2015 | Trinick |
| 2018/0311721 A1 | 11/2018 | Trinick |
| 2019/0084032 A1 | 3/2019 | Henke et al. |

FOREIGN PATENT DOCUMENTS

| | | |
|---|---|---|
| CN | 104684664 A | 6/2015 |
| DE | 102010033714 B3 | 10/2011 |
| GB | 2459557 A | 11/2009 |
| JP | 2860917 B2 | 2/1999 |
| JP | 2013-502550 A | 1/2013 |
| JP | 2015-529562 A | 10/2015 |
| WO | 01/00348 A1 | 1/2001 |
| WO | 02/02259 A1 | 1/2002 |
| WO | 2014/009129 A1 | 1/2014 |
| WO | 2017/148684 A1 | 9/2017 |

* cited by examiner

US 10,960,457 B2

RIVET BONDING MOLD

TECHNICAL FIELD

The technology disclosed herein relates to a rivet joining die which is used to join a plurality of target members to be joined together with a self-piercing rivet.

BACKGROUND ART

A self-piercing rivet may sometimes be used to join a plurality of target members together, and a rivet joining die is used in joining the target members with the self-piercing rivet.

A rivet joining die described in Patent Document 1 includes a base body which makes contact with a die-side target member, which is one of a plurality of target members closest to the die, when the target members are joined together with a self-piercing rivet. The base body is provided with a recess (cavity) that allows the die-side target member to be deformed to bulge when the self-piercing rivet is driven into the target members, and an annular raised portion is formed in a center region of the bottom of the recess.

Further, according to the rivet joining die of Patent Document 1, the raised portion substantially blocks the die-side target member from moving from the inside to outside of the raised portion in a radial direction when the self-piercing rivet is driven into the target members.

CITATION LIST

Patent Document

[Patent Document 1] Japanese Unexamined Patent Publication (Japanese Translation of PCT Application) No. 2015-529592

SUMMARY OF THE INVENTION

Technical Problem

In joining a plurality of target members together with a self-piercing rivet, the rivet joining die is first arranged across the plurality of target members from the self-piercing rivet to be driven into the target members. Then, the self-piercing rivet is driven into the plurality of target members toward the rivet joining die.

In general, the rivet joining die is provided with a recessed cavity that allows one of the plurality of target members closest to the rivet joining die (hereinafter referred to as a "die-side target member") to be deformed to bulge when the self-pierce rivet is driven into the target members. Thus, when the self-piercing rivet is driven into the plurality of target members, the die-side target member is deformed to bulge toward the inside of the cavity. Then, a leg of the self-piercing rivet penetrates the target members other than the die-side target member, and bites into the die-side target member, thereby joining the plurality of target members together. Further, when biting into the die-side target member, the leg of the self-piercing rivet is deformed to flare, and the plurality of target members are firmly joined together.

However, a study by the present inventors has found that the die-side target member may crack when the self-piercing rivet is driven into the plurality of target members to join the target members together with the self-piercing rivet.

A further study by the present inventors has revealed that the die-side target member cracks when a portion of the die-side target member associated with the leg of the self-piercing rivet (hereinafter referred to as a "leg-associated portion") is deformed within the cavity to stretch outward in the radial direction of the cavity. Specifically, when the leg-associated portion of the die-side target member is deformed to stretch outward in the radial direction of the cavity, a portion of the rivet joining die constituting the cavity reduces the stretching deformation. As a result, the leg-associated portion of the die-side target member receives both of a driving load from the self-piercing rivet and a repulsive load from the sidewall of the cavity, which causes the die-side target member to crack.

According to Patent Document 1, the annular raised portion substantially blocks the die-side target member from flowing outward when the self-piercing rivet is driven into the target members. However, in the rivet joining die of Patent Document 1, the annular raised portion restrains the deformation of the leg-associated portion of the die-side target member, and a repulsive load is inputted from the annular raised portion to the leg-associated portion of the die-side target member. This may possibly cause the die-side target member to crack.

The present disclosure provides a rivet joining die that can reduce as much as possible restraint to the deformation of a die-side target member, which is one of a plurality of target members closest to the rivet joining die, when a self-piercing rivet joins the plurality of target members together, and can substantially block the die-side target member from cracking.

Solution to the Problem

To solve the above-described problems, the present disclosure is directed to a rivet joining die arranged across a stack of a plurality of target members from a self-piercing rivet which has a substantially cylindrical leg and which is to be driven the stack of the target members when joining the target members. The rivet joining die includes a columnar die body, an end face of which faces one side in an axial direction thereof is brought into contact with a die-side target member which is one of the target members closest to the die. The die body has a cavity formed in the end face facing the one side in the axial direction except for an outer peripheral portion of the end face, the cavity being circular when viewed from the axial direction, and being recessed from the end face toward the other side in the axial direction to allow the die-side target member to be deformed to bulge toward the other side in the axial direction when the self-piercing rivet is driven into the target members. The cavity is defined by a cavity bottom surface which is circular when viewed from the axial direction, and a cavity side surface having a flat portion. A protrusion jutting toward the one side in the axial direction is formed on an imaginary circle on the cavity bottom surface, the imaginary circle having a diameter which is a mean diameter of an inner diameter and outer diameter of the leg of the self-piercing rivet, and being concentric with the cavity bottom surface. The protrusion includes a single protrusion continuously extending on the imaginary circle, or two or more protrusions intermittently formed on the imaginary circle. The single protrusion or each of the two or more protrusions has a tip end face extending in a direction substantially orthogonal to the axial direction and having a predetermined width in a radial direction. In a cross section of the die body taken along a plane passing a center of the cavity bottom surface and extending in the axial direction, the predetermined width in the radial direction of the tip end face is set to be 10% or more of a diameter of the cavity at an open end thereof, the diameter being defined by a length between two points of intersection between two straight lines respectively extending toward the one side in the axial direction along flat portions of two cavity side surfaces located on both sides in the radial direction and a straight line extending in the radial direction along the end face of the die body facing the one side in the axial direction.

This configuration can substantially block the die-side target member from cracking when the self-piercing rivet joins the plurality of target members together.

Specifically, the die body is provided with a recessed cavity that allows the die-side target member to be deformed to bulge toward the other side in the axial direction of the die-side target member. Thus, when the self-piercing rivet is driven into the stack of the plurality of target members toward the rivet joining die, the plurality of target members is deformed to bulge toward the inside of the cavity of the die body. At this time, a portion of the die-side target member associated with the leg of the self-piercing rivet (hereinafter referred to as a "leg-associated portion") is deformed to stretch outward in the radial direction of the cavity bottom surface. Likewise, a portion of the die-side target member radially inward of the leg (hereinafter referred to as an "inner deformation portion") is also deformed to stretch outward in the radial direction in the same manner as the leg-associated portion. On the other hand, a portion of the die-side target member radially outward of the leg and radially inward of a boundary between the cavity side surface and an end face of the die body facing one side in the axial direction (hereinafter referred to as an "outer deformation portion") is bent toward the other side in the axial direction.

Further, the cavity bottom surface is provided with a protrusion formed on an imaginary circle having a diameter which is a mean diameter of an inner diameter and outer diameter of the leg of the self-piercing rivet and being concentric with the cavity bottom surface. Thus, the leg-associated portion of the die-side target member makes contact with the tip end face of the protrusion on the cavity bottom surface. When the leg-associated portion starts to make contact with the tip end face, the inner and outer deformation portions of the die-side target member are not yet in contact with the cavity bottom surface and the cavity side surface. That is, gaps are formed between the die-side target member and a portion of the cavity bottom surface inward of the protrusion in the radial direction, between the die-side target member and a portion of the cavity side surface outward of the protrusion in the radial direction, and between the die-side target member and the cavity side surface.

When the self-piercing rivet is further driven toward the rivet joining die from the above-described state, the die-side target member is deformed to further bulge toward the inside of the cavity. At this time, the leg-associated portion of the die-side target member is deformed to stretch inward and outward in the radial direction. This is because the gaps allow the leg-associated portion to be deformed. The inner deformation portion of the die-side target member moves toward the portion of the cavity bottom surface inward of the protrusion in the radial direction along with the stretching deformation of the leg-associated portion. The outer deformation portion of the die-side target member is deformed and bent toward the other side in the axial direction toward the portion of the cavity bottom surface outward of the protrusion in the radial direction and the cavity side surface along with the stretching deformation of the leg-associated portion.

When the self-piercing rivet is further driven toward the rivet joining die from the above-described state, the leg of the self-piercing rivet penetrates the target members other than the die-side target member. Thereafter, when the self-piercing rivet is further driven into the target members, the leg of the self-pierce rivet is deformed to flare outward in the radial direction due to a repulsive load from the rivet joining die, and bites into the die-side target member. Thus, the self-piercing rivet finishes the joining of the plurality of target members. At this time, the outer deformation portion of the die-side target member is further deformed and bent toward the other side in the axial direction, and is slightly extruded outward in the radial direction due to the biting of the leg. The leg-associated portion of the die-side target member is pushed by the leg to move inward in the radial direction.

In the disclosed rivet joining die, the cavity bottom surface is provided with a protrusion having an appropriate size and shape (i.e., a protrusion a tip end face of which has a predetermined width in the radial direction which is 10% or more of the diameter of the cavity at the open end thereof). Therefore, when the leg-associated portion makes contact with the tip end face of the protrusion, gaps that allow the leg-associated portion to be deformed are formed between the die-side target member and the portion of the cavity bottom surface inward of the protrusion in the radial direction, between the die-side target member and the portion of the cavity bottom surface outward of the protrusion in the radial direction, and between the die-side target member and the cavity side surface. As a result, when the self-piercing rivet is used to join a plurality of target members together, restraint to the deformation of the die-side target member can be reduced as much as possible, which can substantially block the die-side target member from cracking.

In the rivet joining die, a height of the protrusion from a deepest position of the cavity may be greater than 30% of a depth of the cavity at the deepest position of the cavity.

Specifically, if the height of the protrusion from the deepest position of the cavity is too small, sufficient gaps that allow the leg-associated portion to be deformed are not formed between the die-side target member and the center bottom portion, between the die-side target member and the outer bottom portion, and between the die-side target member and the cavity side surface, when the leg-associated portion of the die-side target member makes contact with the protrusion. Therefore, the height of the protrusion from the deepest position of the cavity is set to be greater than 30% of the depth of the cavity at the deepest position of the cavity. Thus, when the self-piercing rivet is driven into the plurality of target members and the leg-associated portion makes contact with the protrusion, the gaps are sufficiently formed. This allows the leg-associated portion to be suitably deformed, and can effectively substantially block the die-side target member from cracking.

In the rivet joining die, the cavity bottom surface may have a center bottom portion located inward of the protrusion in the radial direction, and an outer bottom portion located outward of the protrusion in the radial direction, and the cavity may have a greater depth at the center bottom portion than at the outer bottom portion.

This configuration can form a gap as large as possible between the die-side target member and the center bottom portion when the leg-associated portion of the die-side target member makes contact with the tip end face. Thus, when the self-piercing rivet is driven into the plurality of target members, the leg-associated portion of the die-side target member can be easily deformed. Further, when the leg of the self-piercing rivet is deformed to flare, the leg-associated portion of the die-side target member easily moves inward in the radial direction. This can substantially block the die-side target member from cracking more effectively. Since the leg of the self-piercing rivet is easily deformed to flare, an appropriate bond strength between the plurality of target members can be ensured.

In the rivet joining die, the cavity bottom surface may have a center bottom portion located inward of the protrusion in the radial direction, and an outer bottom portion located outward of the protrusion in the radial direction, and the outer bottom portion may include a curved portion which is curved so that a middle portion thereof in the radial direction is located further toward the other side in the axial direction than end portions thereof in the radial direction.

This configuration can form a gap as large as possible between the die-side target member and the outer bottom portion when the leg-associated portion of the die-side target member makes contact with the protrusion. Thus, when the self-piercing rivet is driven into the plurality of target members, the leg-associated portion of the die-side target member can be easily deformed. Further, when the leg of the self-piercing rivet is deformed to flare, the outer deformation portion of the die-side target member is easily deformed to stretch. This can substantially block the die-side target member from cracking more suitably.

In one embodiment of the rivet joining die, the protrusion is formed in an annular shape extending continuously in an entire circumferential direction of the imaginary circle.

In another embodiment of the rivet joining die, the protrusion includes two or more protrusions intermittently formed on the imaginary circle, and the protrusions are arranged at equal intervals in the circumferential direction of the imaginary circle.

This configuration can bring substantially the entire leg-associated portion of the die-side target member into contact with the tip end face to form an appropriate gap that allows the leg-associated portion of the die-side target member to be deformed. This can substantially block the die-side target member from cracking more effectively.

In particular, when two or more protrusions are intermittently formed on the imaginary circle, a gap that allows the leg-associated portion of the die-side target member to be deformed is also formed between a pair of protrusions adjacent to each other in the circumferential direction of the imaginary circle. This can substantially block the die-side target member from cracking, more effectively.

In the rivet joint mold, a diameter of the cavity bottom surface may be smaller than the diameter of the cavity at the open end thereof, the cavity side surface is inclined outward in the radial direction toward the one side in the axial direction, and the flat portion of the cavity side surface may be an inclined flat surface.

This configuration allows the outer deformation portion of the die-side target member to be extruded outward in the radial direction when the leg of the self-piercing rivet is deformed to flare. Consequently, restraint to the deformation of the die-side target member can be reduced more suitably, which can substantially block the die-side target from cracking more effectively.

Advantages of the Invention

As can be seen in the foregoing, the disclosed rivet joining die includes a columnar die body. The cavity bottom surface defining the cavity provided for an end face of the die body facing one side in an axial direction of the die body is provided with a protrusion jutting toward the one side in the axial direction. The protrusion is formed on an imaginary circle on the cavity bottom surface, the imaginary circle having a diameter which is a mean diameter of an inner diameter and outer diameter of the leg of the self-piercing rivet, and being concentric with the cavity bottom surface. The protrusion has an appropriate size and shape. Therefore, when the self-piercing rivet is used to join the plurality of target members, restraint to the deformation of the die-side target member can be reduced as much as possible, and the die-side target member can be substantially blocked from cracking.

DESCRIPTION OF EMBODIMENTS

Exemplary embodiments will be described in detail below with reference to the drawings.

First Embodiment

Figure 1:
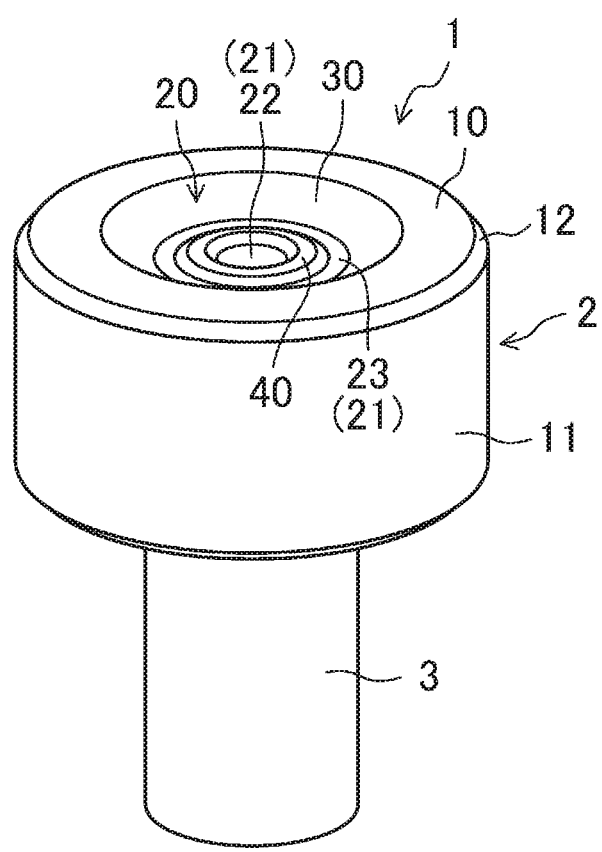
FIG. 1 is a perspective view of a rivet joining die of a first embodiment as viewed from diagonally above.

FIG. 1 shows a rivet joining die 1 of a first embodiment (hereinafter simply referred to as a "die 1"). The die 1 is used to join a plurality of plate-shaped target members 60 to be joined together (see FIGS. 5 to 8) with a self-piercing rivet 50 (hereinafter referred to as "SPR 50," see FIG. 4).

The die 1 includes a columnar die body 2, and a columnar die shank 3 having a smaller diameter than the die body 2. The die body 2 and the die shank 3 are integrally formed to be coaxial with each other. The die body 2 and the die shank 3 respectively have diameters set in accordance with the size of the SPR 50 (see FIG. 4) used for the joining. In a use state, the die 1 is arranged such that the die body 2 is positioned above the die shank 3. Thus, in the following description, based on the use state, a side of the die body 2 opposite to the die shank 3 in an axial direction of the die body 2 will be referred to as an upper side (corresponding to one side in the axial direction), and a side toward the die shank 3 will be referred to as a lower side (corresponding to the other side in the axial direction).

Figure 2:
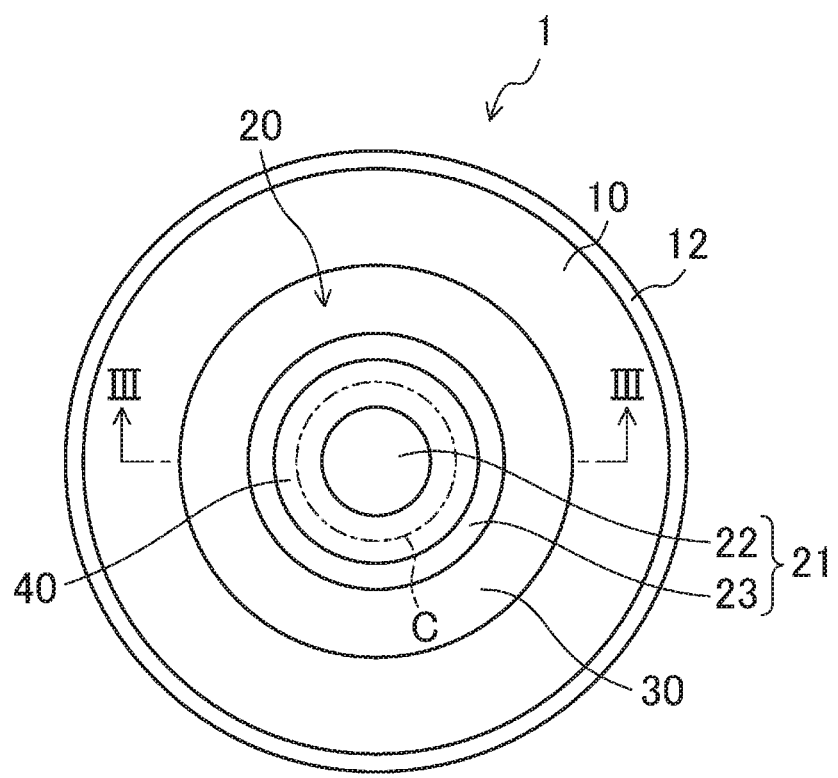
FIG. 2 is a plan view of the rivet joining die as seen from above.

As shown in FIGS. 5 to 8, an upper surface 10, which is an upper end face (i.e., an end face on one side in the axial direction) of the die body 2, is a surface that makes contact with a die-side target member 61, which is one of the target members 60 closest to the die 1, when the SPR 50 joins the target members 60 together. As shown in FIGS. 1 and 2, an edge formed by the upper surface 10 and a side surface 11 of the die body 2 is bevelled to form a bevel 12 over the entire circumference of the upper surface 10.

As shown in FIGS. 1 and 2, a cavity 20 recessed downward from the upper surface 10 is formed in a portion of the upper surface 10, more specifically, in a portion except for an outer peripheral portion of the upper surface 10. The cavity 20 is circular when viewed from the axial direction as shown in FIG. 2. In the present embodiment, the cavity 20 is coaxial with the die body 2. The detailed configuration of the cavity 20 will be described later.

Figure 4:
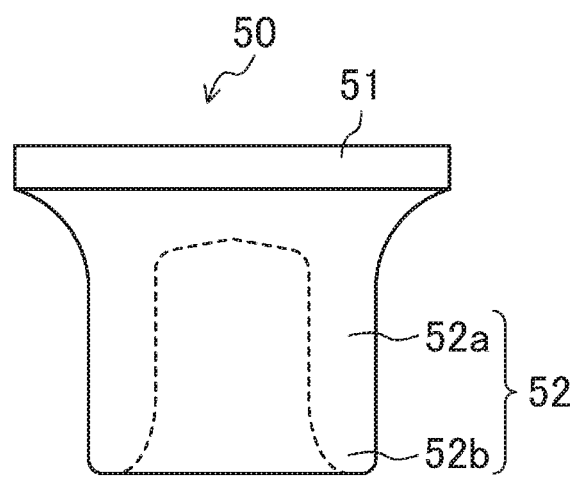
FIG. 4 is a side view of a self-piercing rivet.

The SPR 50 is made of, for example, chrome molybdenum steel, and has a rivet head 51, and a leg 52 which is provided continuously from the rivet head 51 as shown in FIG. 4. The leg 52 is cylindrical and has a smaller diameter than the rivet head 51, and an end thereof opposite to the rivet head 51 in a cylinder axis direction (coincides with a center axis direction of the whole SPR 50) is open. The length of the leg 52 in the cylinder axis direction is set in accordance with the total thickness of the plurality of target members 60. Note that the leg 52 does not have to be strictly cylindrical, and may have a C-shape when viewed in the cylinder axis direction, or may have two U-shaped portions arranged with their openings facing each other.

As shown in FIG. 4, the leg 52 has a base portion 52a extending in the cylinder axis direction with a constant thickness, and a tip end portion 52b which is narrowed from an end of the base portion 52a opposite to the rivet head 51 as it extends away from the rivet head 51. More specifically, the tip end portion 52b has a radially outer portion extending straight in the cylinder axis direction, and a radially inner portion which flares and is tapered as it extends away from the rivet head 51, i.e., the thickness thereof gradually decreases as it goes outward in the radial direction. When the SPR 50 is driven into the target member 60, the leg 52 having the above-described shape is deformed to flare outward in the radial direction, and the deformed leg 52 firmly joins the target members 60 together.

Figure 5:
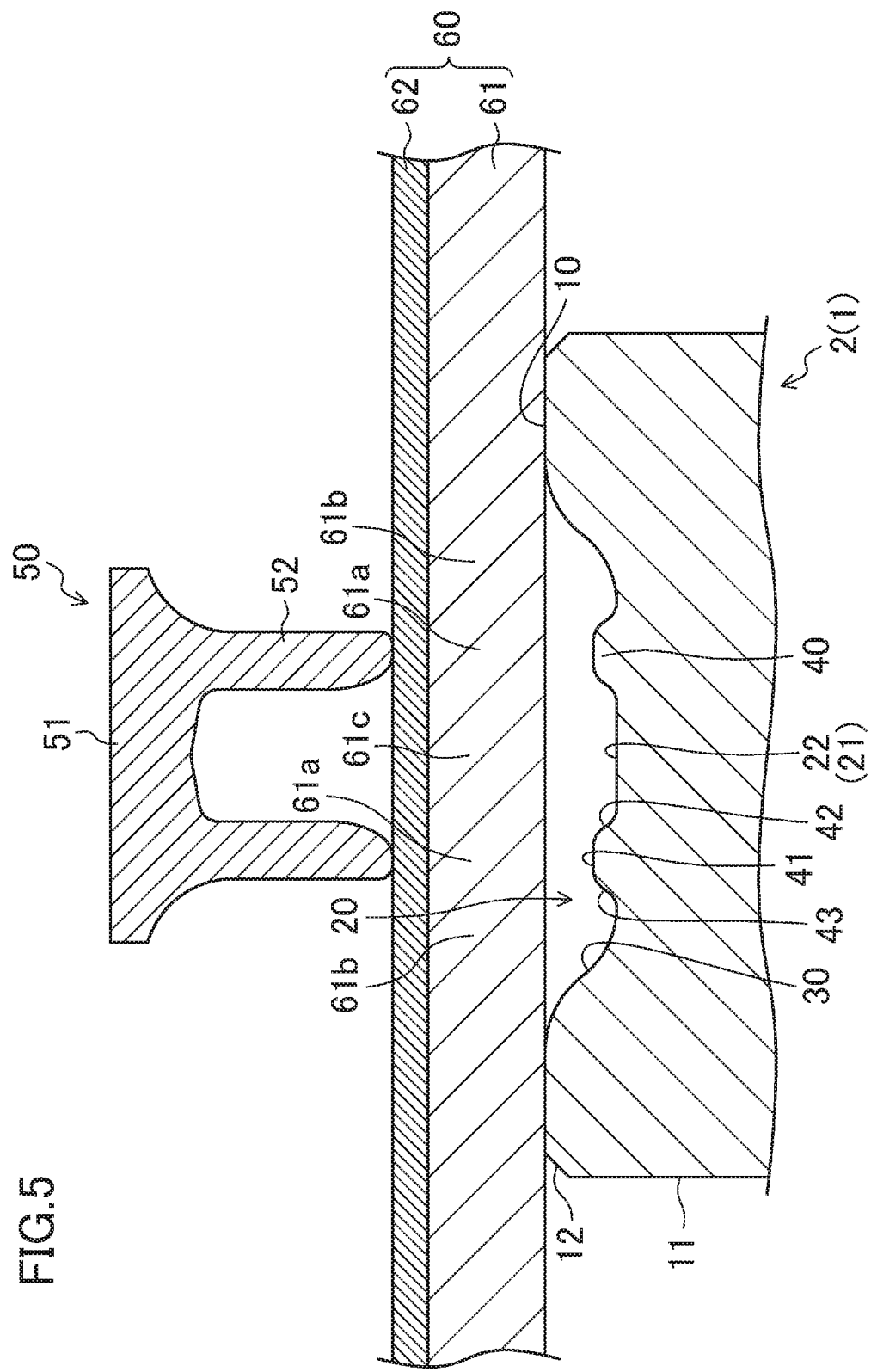
FIG. 5 is a cross-sectional view illustrating how the rivet joining die, the self-piercing rivet, and two target members are arranged to join the two target members together using the rivet joining die.

When actually joining the plurality of target members 60 together with the SPR 50, the SPR 50 is arranged to face the die 1 with a stack of the plurality of target members 60 interposed between the SPR 50 and the die 1 as shown in FIG. 5. Thereafter, the SPR 50 is driven into the plurality of target members 60 toward the die 1. When the SPR 50 is driven into the plurality of target members 60, the target members 60 are deformed to bulge toward the inside of the cavity 20. Specifically, the cavity 20 allows the plurality of target members 60 (in particular, the die-side target member 61) to be deformed to bulge downward (i.e., toward the other side in the axial direction) when the SPR 50 is driven into the target members 60.

Figure 8:
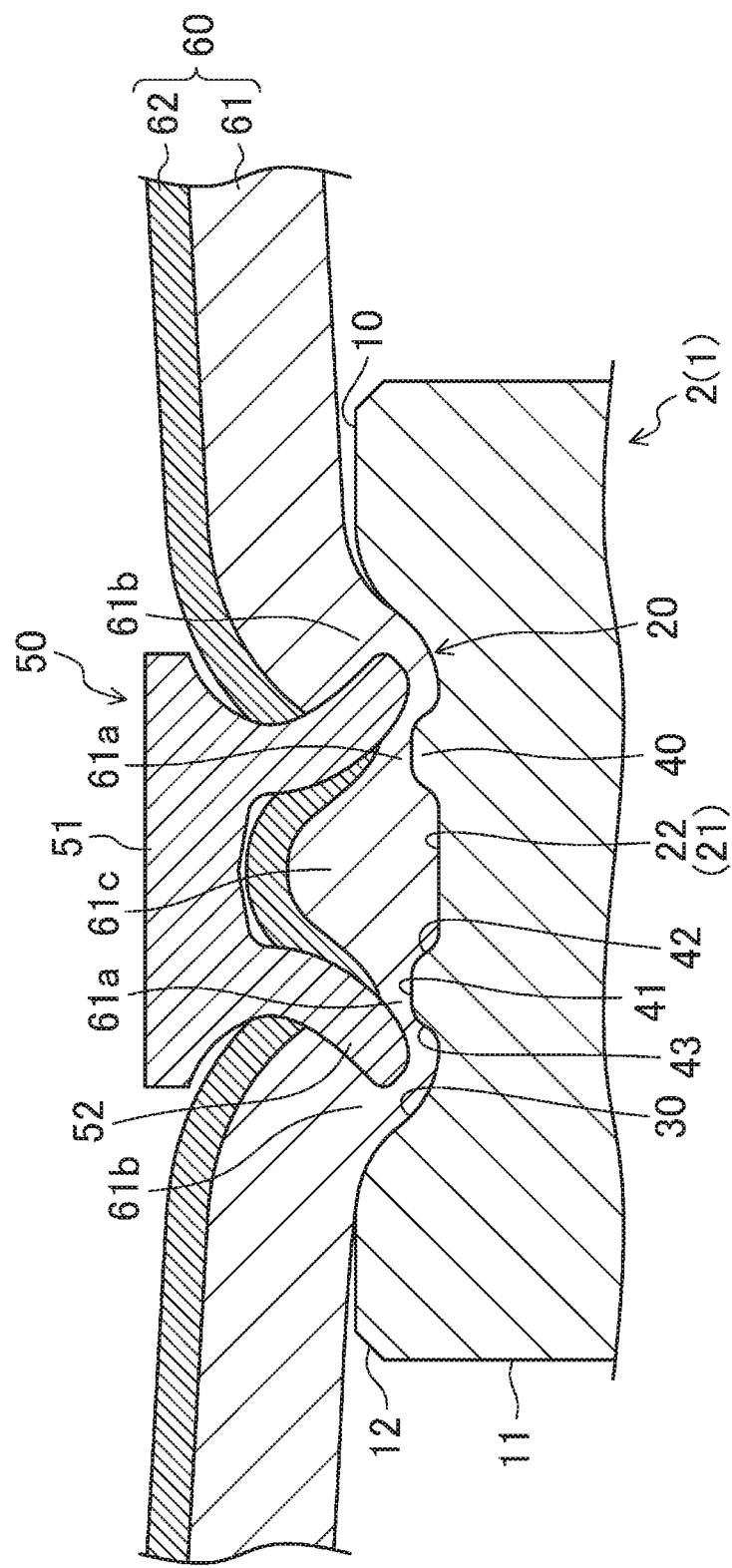
FIG. 8 is a cross-sectional view illustrating a state where the self-piercing rivet has finished the joining of the two target members.

Then, once the SPR 50 has finished the joining of the target members, the base portion 52a of the SPR 50 penetrates the target members 60 other than the die-side target member 61, and the tip end portion 52b of the SPR 50 bites into the die-side target member 61 as shown in FIG. 8.

When the SPR 50 is used to join the plurality of target members 60 together as described above, the die 1 restrains the deformation of the die-side target member 61 when the SPR 50 is driven into the target members. This may cause the die-side target member 61 to crack. In particular, if the die-side target member 61 is made of aluminum or a material whose indentation hardness is equal to or lower than that of aluminum, the die-side target member cracks with high probability. If a crack is produced in the die-side target member 61, corrosion of the target members 60 may possibly start from the crack. For this reason, the crack needs to be substantially blocked appropriately.

Therefore, in the first embodiment, the shape of the cavity 20 of the die 1 is contrived to substantially block the die-side target member 61 from cracking. A detailed configuration of the cavity 20 will be described below.

Figure 3:
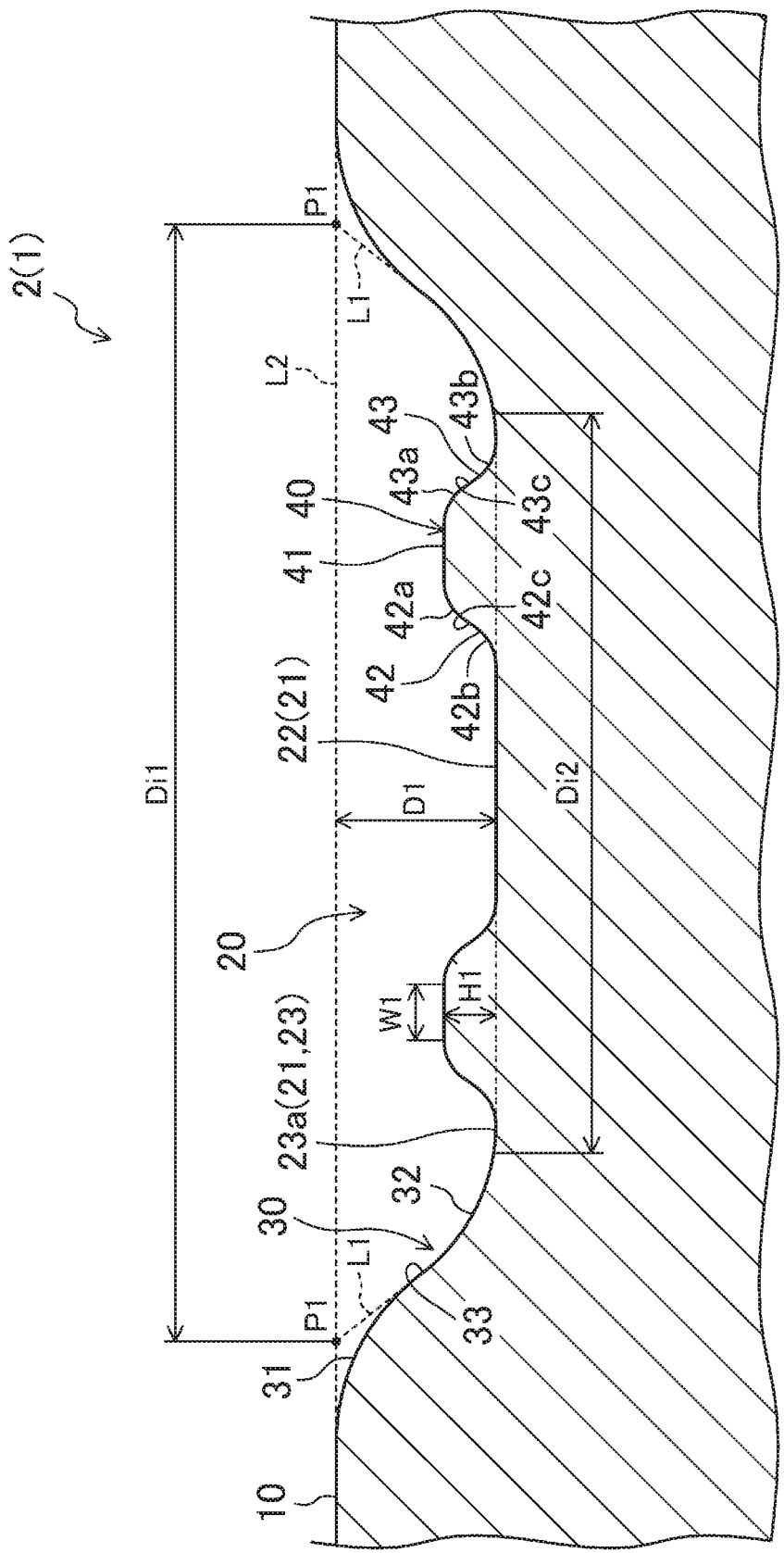
FIG. 3 is a cross-sectional view taken along line shown in FIG. 2 illustrating an enlargement of a portion around a cavity in a die body.

As shown in FIGS. 2 and 3, the cavity 20 includes a cavity bottom surface 21 which is circular when viewed from the axial direction, and a cavity side surface 30. The cavity bottom surface 21 has a diameter $Di2$, a value of which is smaller than a diameter $Di1$ of the cavity 20 at an open end thereof. As shown in FIG. 3, the diameter $Di2$ of the cavity bottom surface 21 is a diameter measured at a radially outer end of an outer bottom portion 23, which will be described later, of the cavity bottom surface 21. The definition of the diameter $Di1$ at the open end of the cavity 20 will be described later.

As shown in FIGS. 2 and 3, the cavity bottom surface 21 is provided with a protrusion 40 jutting upward on an imaginary circle C on the cavity bottom surface 21, the imaginary circle C having a diameter which is a mean diameter of inner and outer diameters of the leg 52 of the SPR 50 and being concentric with the cavity bottom surface 21.

As shown in FIG. 2, the protrusion 40 is formed in an annular shape extending continuously in an entire circumferential direction of the imaginary circle C. Thus, the protrusion 40 divides the cavity bottom surface 21 into a center bottom portion 22 which is located inward of the protrusion 40 in the radial direction and is circular when viewed from the axial direction, and an outer bottom portion 23 which is located outward of the protrusion 40 in the radial direction and is annular when viewed from the axial direction.

As shown in FIGS. 2 and 3, the center bottom portion 22 is a flat surface extending in a direction orthogonal to the axial direction (i.e., a horizontal direction). The outer bottom portion 23 is formed as a curved portion 23a which is curved so that a middle portion thereof in the radial direction is located lower than end portions thereof in the radial direction over the entire circumferential direction. Thus, the curved portion 23a is formed in a region radially outward of the protrusion 40 and between the protrusion 40 and the cavity side surface 30 in the radial direction.

As shown in FIG. 3, the cavity side surface 30 is inclined upward toward the outside in the radial direction from the radially outer end of the cavity bottom surface 21 (strictly speaking, of the outer bottom portion 23). More specifically, when viewed in section taken along the radial direction as shown in FIG. 3, the cavity side surface 30 includes: an upper side surface portion 31 which is inclined and curved continuously from the upper surface 10; a lower side surface portion 32 which is inclined and curved continuously from the outer bottom portion 23; and an inclined flat portion 33 (flat portion) which is inclined upward toward the outside in the radial direction so as to connect a lower end of the upper side surface portion 31 and an upper end of the lower side surface portion 32.

The protrusion 40 has a tip end face 41 extending in a direction orthogonal to the axial direction (i.e., horizontal direction) and having a predetermined width W1 in the radial direction. Thus, as shown in FIG. 3, the protrusion 40 has a trapezoidal shape when viewed in section taken along the radial direction of the die body 2. A portion of the protrusion 40 radially inward of the tip end face 41 is an inner inclined portion 42 which is inclined downward toward the inside in the radial direction. A portion of the protrusion 40 radially outward of the tip end face 41 is an outer inclined portion 43 which is inclined downward toward the outside in the radial direction.

As shown in FIG. 3, the inner inclined portion 42 has a substantially S-shape when viewed in section taken along the radial direction. More specifically, the inner inclined portion 42 includes an upper curved portion 42a which is inclined and curved continuously from the tip end face 41, a lower curved portion 42b which is inclined and curved continuously from the center bottom portion 22, and an inclined flat portion 42c inclined upward toward the outside in the radial direction so as to connect a lower end of the upper inclined portion 42a and an upper end of the lower inclined portion 42b.

Similarly to the inner inclined portion 42, the outer inclined portion 43 is also substantially S-shaped when viewed in section taken along the radial direction. More specifically, the outer inclined portion 43 includes an upper curved portion 43a which is inclined and curved continuously from the tip end face 41, a lower curved portion 43b which is inclined and curved continuously from the center bottom portion 22, and an inclined flat portion 43c which extends linearly in the axial direction and is inclined upward toward the inside in the radial direction so as to connect a lower end of the upper curved portion 43a and an upper end of the lower curved portion 43b.

In the first embodiment, the predetermined width W1 in the radial direction of the tip end face 41 is set to be 10% or more of the diameter Di1 of the cavity 20 at its open end.

Specifically, in a cross section taken along a plane passing the center of the cavity bottom surface 21 and extending in the axial direction as shown in FIG. 3, the diameter Di1 of the cavity 20 at the open end is defined by the length between two intersection points P, which are points of intersection between two straight lines L1 respectively extending upward along the inclined flat portions 33 of the cavity side surfaces 30 located on both sides in the radial direction and a straight line L2 extending in the radial direction along the upper surface 10. The predetermined width W1 of the tip end face 41 is set to be 10% or more of the diameter Di1 of the cavity 20 at the open end defined as described above.

The diameter Di1 of the cavity 20 at the open end is determined in accordance with the diameter of the leg 52 of the SPR 50. Specifically, the diameter Di1 is set to be a suitable value such that the leg 52 of the SPR 50 can easily penetrate the plurality of target members 60 other than the die-side target member 61, and can be easily deformed to flare within the target members.

In the first embodiment, the height H1 of the protrusion 40 from the deepest position of the cavity 20 is set to be greater than 30% of the depth D1 of the cavity 20 at the deepest position of the cavity 20. In the first embodiment, the cavity 20 has the maximum depths at the center bottom portion 22 and the curved portion of the outer bottom portion 23, and the depths are approximately equal to each other. Therefore, as shown in FIG. 3, the height of the protrusion 40 from the center bottom portion 22 is set to be greater than 30% of the depth of the cavity 20 at the center bottom portion 22.

Referring to FIGS. 5 to 8, how the SPR 50 and two target members 60 move when the two target members 60 are joined together with the SPR 50 using the die 1 of the first embodiment will be described below. In the following description, one of the two target members 60 on which the SPR 50 is arranged in the joining operation will be referred to as a "rivet-side target member 62." When a distinction between the die-side target member 61 and the rivet-side target member 62 is unnecessary, they will be simply referred to as the target members 60. In the first embodiment, the die-side target member 61 is a plate of aluminum or an aluminum alloy, and the rivet-side target member 62 is a steel plate. Although not described in detail, an actual joining operation is performed using a common rivet joining apparatus.

To join the two target members 60 with the SPR 50, first, the die-side target member 61 and the rivet-side target member 62 are stacked together so that the die-side target member 61 makes contact with the upper surface 10 of the die 1 as shown in FIG. 5. Next, as shown in FIG. 5, the SPR 50 is arranged to face the die 1 with both of the target members 61 and 62 interposed between the SPR 50 and the die 1. Specifically, the die 1 is arranged across the stack of the plurality of (two in this embodiment) target members 60 from the SPR 50 to be driven into the target members 60. At this time, as shown in FIG. 5, the protrusion 40 of the die 1 comes to a position corresponding to the leg 52 of the SPR 50. Actually, the rivet joining apparatus is provided with guides which position the die 1 and the SPR 50, and guides the SPR 50 to move in a suitable direction. Thus, when the die 1 and the SPR 50 are arranged in accordance with the guides, the positional relationship shown in FIG. 5 can be automatically established.

Figure 6:
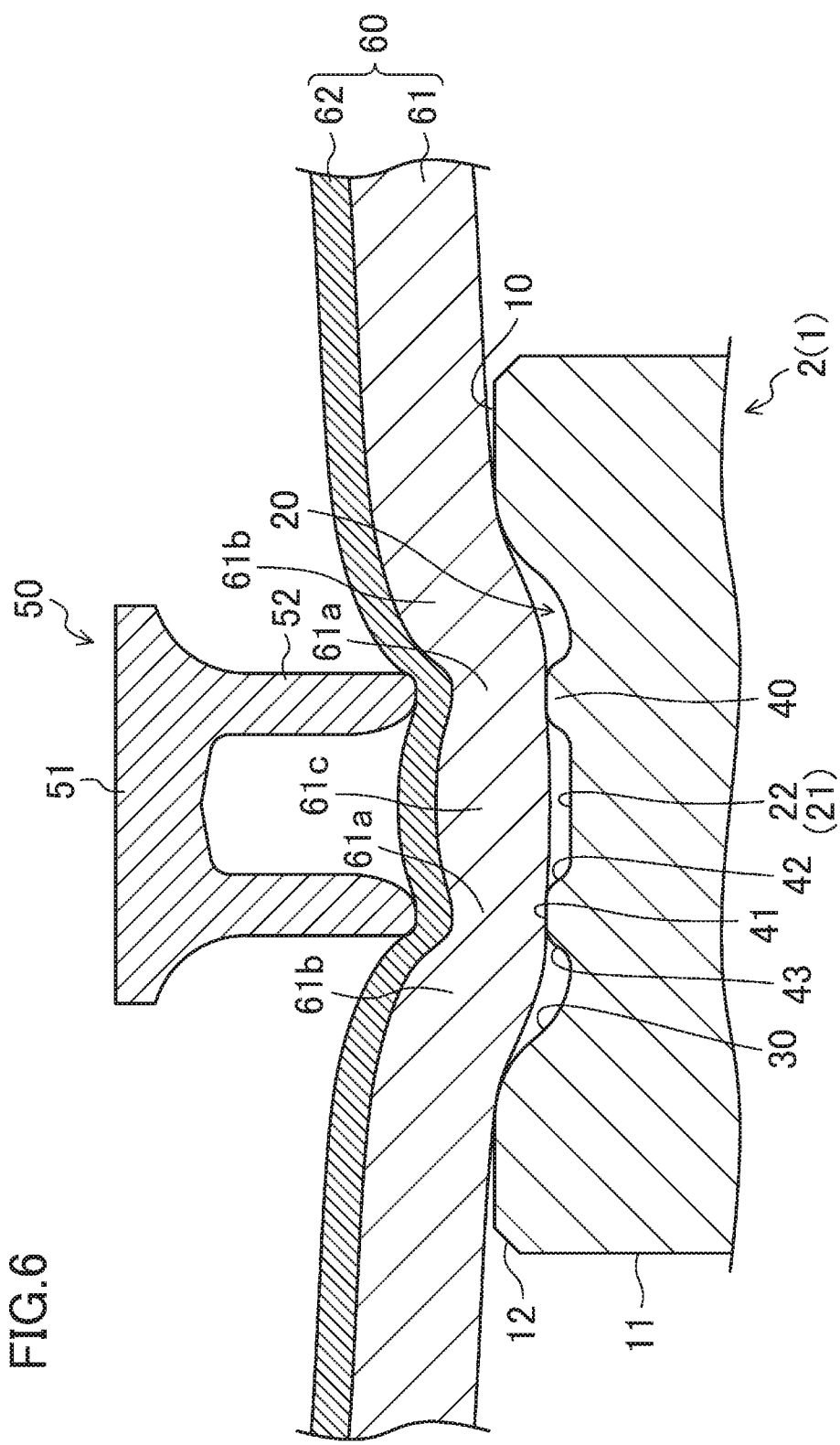
FIG. 6 is a cross-sectional view illustrating the self-piercing rivet driven toward the rivet joining die from the position of FIG. 5.

When the SPR 50 is driven toward the die 1 from the state shown in FIG. 5, the two target members 61 and 62 are deformed to bulge toward the inside of the cavity 20 as shown in FIG. 6. At this time, a portion of the die-side target member 61 associated with the leg 52 of the SPR 50 (hereinafter referred to as an "leg-associated portion 61a) is deformed to stretch outward in the radial direction of the cavity bottom surface 21. A portion of the die-side target member 61 radially inward of the leg 52 (hereinafter referred to as an "inner deformation portion 61c") is also deformed to stretch outward in the radial direction as the leg-associated portion 61a is. On the other hand, a portion of the die-side target member 61 radially outward of the leg 52 and radially inward of a boundary between the cavity side surface 30 and the upper surface 10 of the die body 2 (hereinafter referred to as an "outer deformation portion 61b) is bent downward.

Further, as shown in FIG. 6, the leg-associated portion 61a of the die-side target member 61 makes contact with the tip end face 41 of the protrusion 40 of the cavity bottom surface 21. The outer and inner deformation portions 61b and 61c of the die-side target member 61 do not make contact with the cavity bottom surface 21 and the cavity side surface 30. That is, gaps are formed between the die-side target member 61 and a portion of the cavity bottom surface 21 inward of the protrusion 40 in the radial direction (center bottom portion 22), between the die-side target member 61 and a portion of the cavity bottom surface 21 outward of the protrusion 40 in the radial direction (outer bottom portion 23), and between the die-side target member 61 and the cavity side surface 30.

Figure 7:
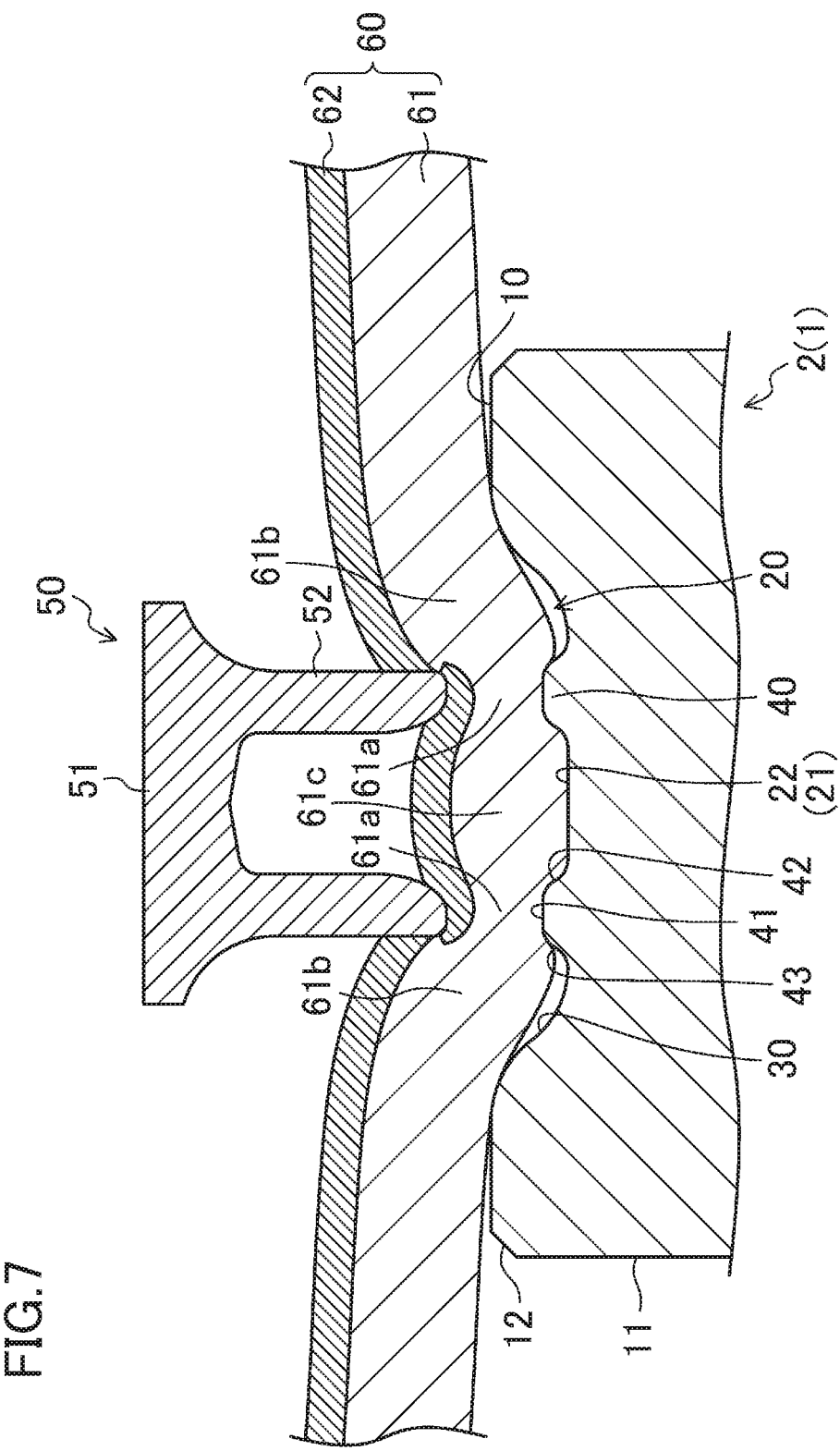
FIG. 7 is a cross-sectional view illustrating the self-piercing rivet further driven toward the rivet joining die from the position of FIG. 6.

When the SPR 50 is further driven toward the die 1 from the state shown in FIG. 6, the leg 52 of the SPR 50 breaks the rivet-side target member 62 as shown in FIG. 7. The die-side target member 61 is deformed to bulge further toward the inside of the cavity 20. At this time, the leg-associated portion 61a of the die-side target member 61 is deformed to stretch inward and outward in the radial direction. This is because the gaps allow the leg-associated portion 61a to be deformed. The inner deformation portion 61c of the die-side target member 61 moves to be extruded toward the center bottom portion 22 along with the stretching deformation of the leg-associated portion 61a, and makes contact with the center bottom portion 22. The outer deformation portion 61b of the die-side target member 61 is bent downward toward the outer bottom portion 23 and the cavity side surface 30 along with the stretching deformation of the leg-associated portion 61a.

When the SPR 50 is further driven toward the die 1 from the state shown in FIG. 7, the leg 52 of the SPR 50 is deformed to flare outward in the radial direction by a repulsive load from the die 1, and bites into the die-side target member 61 as shown in FIG. 8. At this time, the outer deformation portion 61b of the die-side target member 61 is further bent downward, and is slightly extruded outward in the radial direction due to the biting of the leg 52. The leg-associated portion 61a of the die-side target member 61 is pushed by the leg 52 to move inward in the radial direction. Then, as shown in FIG. 8, when the SPR 50 is driven into the target members 61 and 62 to such an extent that the leg 52 of the SPR 50 is embedded in both of the target members 61 and 62, the SPR 50 finishes the joining of the rivet-side target member 62 and the die-side target member 61.

In this way, the rivet-side target member 62 and the die-side target member 61 are joined with the SPR 50. According to the die 1 of the first embodiment, when the leg-associated portion 61a of the die-side target member 61 makes contact with the tip end face 41, gaps that allow the leg-associated portion 61a to be deformed are formed on the inner and outer sides of the protrusion 40 in the radial direction. Thus, when the SPR 50 is used to join the plurality of target members 60, restraint to the deformation of the die-side target member 61 can be reduced as much as possible, which can substantially block the die-side target member 61 from cracking.

If the predetermined width W1 of the tip end face 41 in the radial direction of the cavity bottom surface 21 is too small, the leg-associated portion 61a of the die-side target member 61 that has made contact with the tip end face 41 cannot be easily deformed to stretch inward and outward in the radial direction. Further, the protrusion 40 may bite into the die-side target member 61, and may produce a crack in the die-side target member 61. Therefore, in the present embodiment, the predetermined width W1 of the tip end face 41 in the radial direction is set to be 10% or more of the diameter Di1 of the cavity 20 at the open end. Specifically, in a cross section of the die body 2 taken along a plane passing the center of the cavity bottom surface 21 and extending in the axial direction, the diameter Di1 is defined by the length between two intersection points P, which are points of intersection between two straight lines L1 respectively extending upward along the inclined flat portions 33 of the cavity side surfaces 30 located on both sides in the radial direction and a straight line L2 extending in the radial direction along the upper surface 10.

If the height H1 of the protrusion 40 from the deepest position of the cavity 20 is too small, sufficient gaps that allow the leg-associated portion 61a to be deformed are not formed on the radially inner and outer sides of the protrusion 40 when the leg-associated portion 61a of the die-side target member 61 makes contact with the tip end face 41. Therefore, in the first embodiment, the height H1 of the protrusion 40 from the deepest position of the cavity 20 is set to be greater than 30% of the depth D1 of the cavity 20 at the deepest position of the cavity 20.

Further, in the first embodiment, the inner and outer inclined portions 42 and 43 are respectively provided with upper curved portions 42a and 43a which are continuous with the tip end face 41. This can substantially block the die-side target member 61 from cracking more suitably. That is, if the tip end face 41 and the inner and outer inclined portions 42 and 43 form sharp edges, the edges may bite into the die-side target member 61 when the die-side target member 61 makes contact with the tip end face 41 and then the SPR 50 is driven toward the die 1. The biting of the edges may cause a crack. As in the first embodiment, when the upper curved portions 42a and 43a are provided for the inner and outer inclined portions 42 and 43, no edges bite into the die-side target member 61, and the die-side target member 61 is substantially blocked from cracking more suitably.

Further, in the first embodiment, the cavity side surface 30 is inclined upward toward the outside in the radial direction from the radially outer end of the cavity bottom surface 21 (strictly speaking, of the outer bottom portion 23). Consequently, when the SPR 50 is driven toward the die 1, especially when the leg 52 of the SPR 50 bites into the die-side target member 61, the die 1 does not easily restrain the deformation of the outer deformation portion 61b of the die-side target member 61, and the outer deformation portion 61 is appropriately extruded outward in the radial direction. This can appropriately relieve the repulsion load applied from the cavity side surface 30, and the die-side target member 61 can be suitably substantially blocked from cracking.

As can be seen in the foregoing, the rivet joining die of the first embodiment includes the columnar die body 2, an end face of which faces one side (upper side) in the axial direction (upper surface 10) is brought into contact with the die-side target member 61. The die body 2 has the cavity 20 which is formed in the end face except for an outer peripheral portion thereof, circular when viewed from the axial direction, and recessed from the end face toward the other side in the axial direction to allow the die-side target member 61 to be deformed to bulge toward the other side in the axial direction when the SPR 50 is driven into the target members. The cavity 20 is defined by the cavity bottom surface 21 which is circular when viewed from the axial direction, and the cavity side surface 30 having a flat portion (inclined flat portion 33). The protrusion 40 jutting toward the one side in the axial direction is formed on the imaginary circle C on the cavity bottom surface 21, the imaginary circle C having a diameter which is a mean diameter of the inner and outer diameters of the leg 52 of the SPR 50, and being concentric with the cavity bottom surface 21. The protrusion 40 has the tip end face 41 extending in a direction substantially orthogonal to the axial direction and having a predetermined width W1 in the radial direction. In a cross section of the die body 2 taken along a plane passing the center of the cavity bottom surface 21 and extending in the axial direction, the predetermined width W1 in the radial direction of the tip end face 41 is set to be 10% or more of the diameter Di1 of the cavity 20 at the open end thereof, the diameter Di1 being defined by a length between two points of intersection between two straight lines L1 respectively extending toward the one side in the axial direction along the flat portions of two cavity side surfaces 30 located on both sides in the radial direction and a straight line L2 extending in the radial direction along the end face of the die body 2. Therefore, when the SPR 50 is used to join the plurality of target members 60, restraint to the deformation of the die-side target member 61 can be reduced as much as possible, and the die-side target member 61 can substantially blocked from cracking.

Second Embodiment

Figure 9:
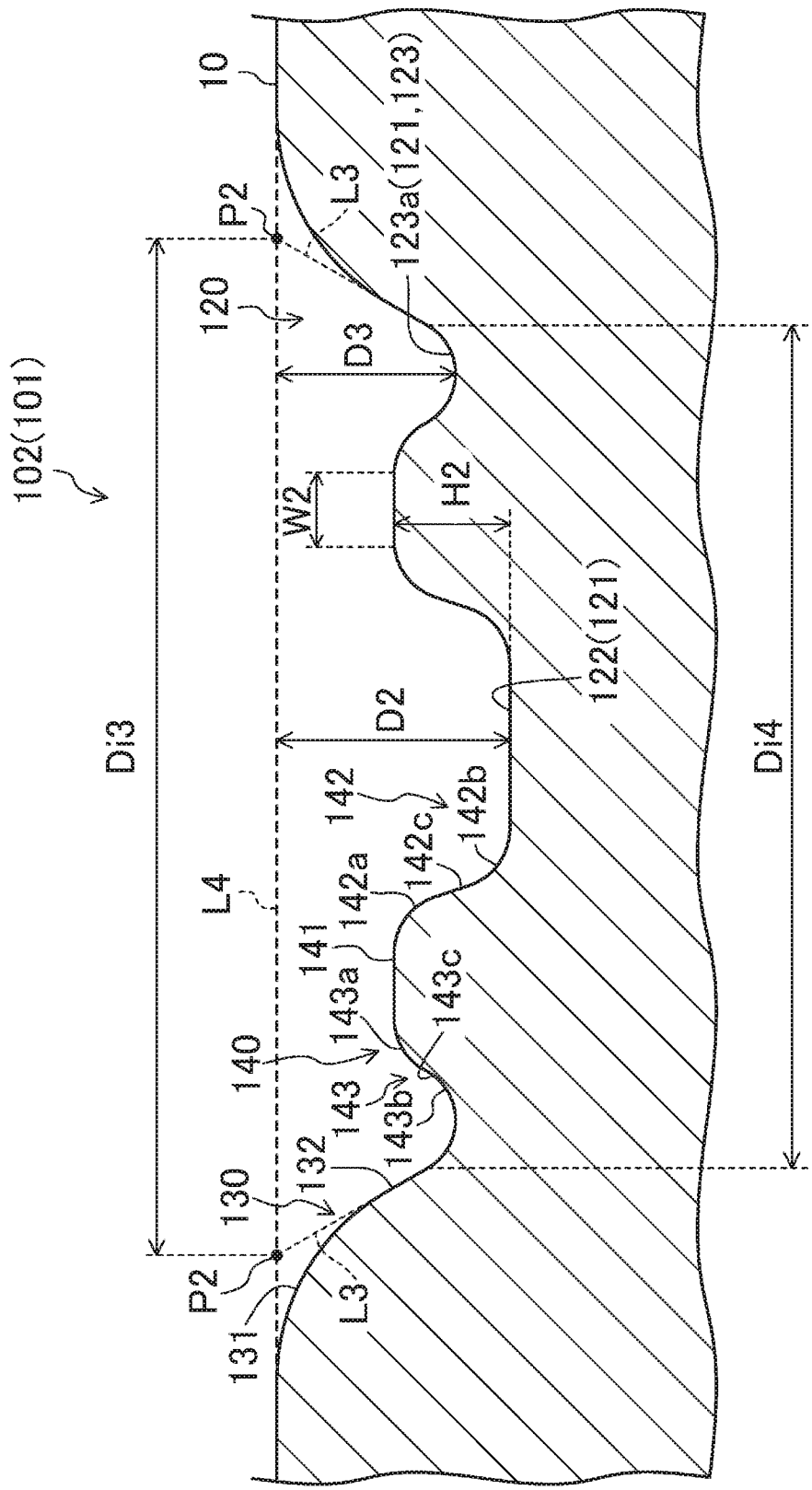
FIG. 9 is a view corresponding to FIG. 3, illustrating a rivet joining die of a second embodiment.

FIG. 9 shows a die body 102 of a rivet joining die 101 according to a second embodiment (hereinafter referred to as a "die 101"). In FIG. 9, the same reference characters designate portions common with those of the first embodiment. In the following description, the portions common with those of the first embodiment are not described in detail.

In the second embodiment, a cavity 120 has a shape different from that of the first embodiment. A detailed configuration of the cavity 120 of the second embodiment will be described below.

As shown in FIG. 9, the cavity 120 is defined by a cavity bottom surface 121 and a cavity side surface 130. The cavity 120 is circular when viewed from the axial direction of the die body 102, similarly to that of the first embodiment described above. The cavity bottom surface 121 has a diameter Di4, a value of which is smaller than diameter Di3 of the cavity 120 at an open end thereof. As shown in FIG. 9, the diameter Di4 of the cavity bottom surface 121 is a diameter measured at a radially outer end of an outer bottom portion 123, which will be described later, of the cavity bottom surface 121. The definition of the diameter Di3 at the open end of the cavity 120 will be described later.

As shown in FIG. 9, the cavity bottom surface 121 is provided with a protrusion 140 jutting upward from the cavity bottom surface 121. In the same manner as in the first embodiment, the protrusion 140 is formed on an imaginary circle (not shown) having a diameter which is a mean diameter of inner and outer diameters of the leg 52 of the SPR 50, and being concentric with the cavity bottom surface 121.

In the second embodiment, similarly to the above-described first embodiment, the protrusion 140 is formed in an annular shape extending continuously in the entire circumferential direction of the imaginary circle. Thus, in the same manner as in the first embodiment, the protrusion 140 divides the cavity bottom surface 121 into a center bottom portion 122 which is located inward of the protrusion 140 in the radial direction and is circular when viewed from the axial direction, and an outer bottom portion 123 which is located outward of the protrusion 140 in the radial direction and is annular when viewed from the axial direction.

As shown in FIG. 9, the center bottom portion 122 is a flat surface extending in a direction orthogonal to the axial direction (i.e., a horizontal direction). The outer bottom portion 123 is formed as a curved portion 123a which is curved so that a middle portion thereof in the radial direction is located lower than end portions thereof in the radial direction over the entire circumferential direction. Thus, the curved portion is formed in a region radially outward of the protrusion 140 and between the protrusion 140 and the cavity side surface 130 in the radial direction.

As shown in FIG. 9, the depth D2 of the cavity 120 at the center bottom portion 122 is greater than the depth D3 of the cavity 120 at the deepest position of the outer bottom portion 123.

As shown in FIG. 9, the cavity side surface 130 is inclined upward toward the outside in the radial direction from a radially outer end of the cavity bottom surface 121 (strictly speaking, of the outer bottom portion 123). More specifically, when viewed in section taken along the radial direction as shown in FIG. 9, the cavity side surface 130 includes: an upper side surface portion 131 which is inclined and curved continuously from the upper surface 10; and a lower side surface portion 132 which is inclined upward toward the outside in the radial direction so as to connect a lower end of the upper side surface portion 131 and a radially outer end of the outer bottom portion 123. In the second embodiment, the lower side surface portion 132 corresponds to the inclined flat portion (the flat portion).

The protrusion 140 has a tip end face 141 extending in a direction orthogonal to the axial direction and having a predetermined width W2 in the radial direction. Thus, as shown in FIG. 9, the protrusion 140 has a trapezoidal shape when viewed in section taken along the radial direction of the die body 102. A portion of the protrusion 140 radially inward of the tip end face 141 is an inner inclined portion 42 which is inclined downward toward the inside in the radial direction. A portion of the protrusion 140 radially outward of the tip end face 141 is an outer inclined portion 143 which is inclined downward toward the outside in the radial direction.

As shown in FIG. 9, the inner inclined portion 142 includes an upper curved portion 142a which is inclined and curved continuously from tip end face 141, a lower curved portion 142b which is inclined and curved continuously from the center bottom portion 122, and an inclined flat portion 142c which is linearly inclined to connect a lower end of the upper curved portion 142a and an upper end of the lower curved portion 142b.

Similarly to the inner inclined portion 142, the outer inclined portion 143 also includes an upper curved portion 143a which is inclined and curved continuously from the tip end face 141, a lower curved portion 143b which is inclined and curved continuously from the center bottom portion 122, and an inclined flat portion 143c which extends linearly in the axial direction and is inclined upward toward the inside in the radial direction so as to connect a lower end of the upper curved portion 143a and an upper end of the lower curved portion 143b.

In the second embodiment, the predetermined width W2 in the radial direction of the tip end face 141 is set to be 10% or more of the diameter Di3 of the cavity 120 at its open end.

Specifically, in a cross section taken along a plane passing the center of the cavity bottom surface 121 and extending in the axial direction as shown in FIG. 9, the diameter Di3 of the cavity 120 at the open end is defined by the length between two intersection points P2, which are points of intersection between two straight lines L3 respectively extending upward along the lower side surface portions 132 of the cavity side surfaces 130 located on both sides in the radial direction and a straight line L4 extending in the radial direction along the upper surface 10. The predetermined width W2 of the tip end face 141 is set to be 10% or more of the diameter Di3 of the cavity 120 at the open end defined as described above.

The diameter Di3 of the cavity 120 at the open end is determined in accordance with the diameter of the leg 52 of the SPR 50, in the same manner as in the first embodiment. Specifically, the diameter Di3 is set to a suitable value such that the leg 52 of the SPR 50 can easily penetrate the target members 60 other than the die-side target member 61, and can easily flare within the target members.

In the second embodiment, the height H2 of the protrusion 140 from the center bottom portion 122 is set to be greater than 30% of the depth D2 of the cavity 120 at the center bottom portion 122.

Referring to FIGS. 10 to 13, how the SPR 50 and two target members 60 move when the two target members 60 are joined together with the SPR 50 using the die 101 of the second embodiment will be described below. In the second embodiment, similarly to the first embodiment, the die-side target member 61 is a plate of aluminum or an aluminum alloy, and the rivet-side target member 62 is a steel plate. Although not described in detail, an actual joining operation is performed using a common rivet joining apparatus.

Figure 10:
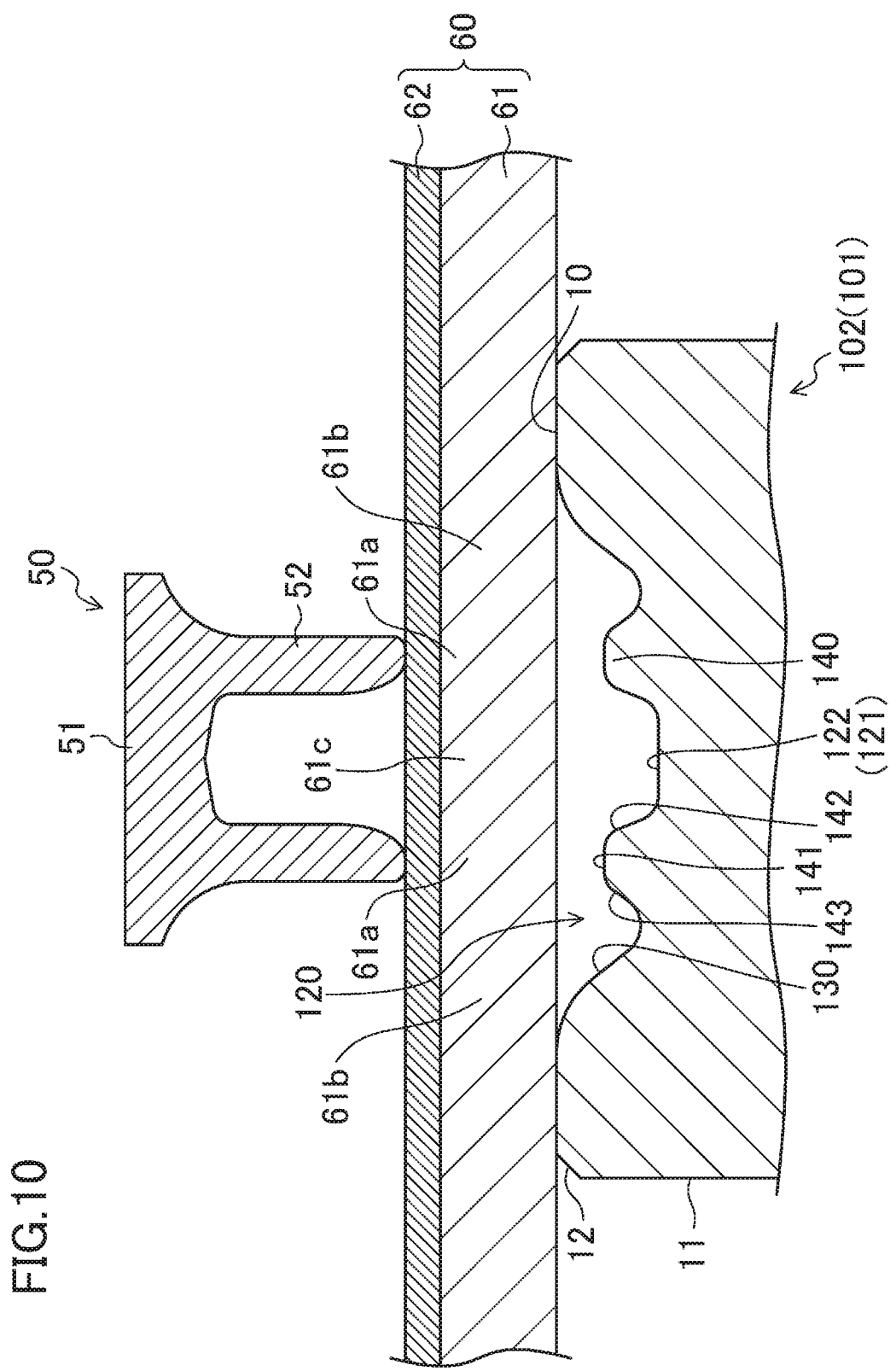
FIG. 10 is a view corresponding to FIG. 5, illustrating the rivet joining die of the second embodiment.

To join the two target members 60 with the SPR 50, first, the die-side target member 61 and the rivet-side target member 62 are stacked together so that the die-side target member 61 makes contact with the upper surface 10 of the die 101 as shown in FIG. 10. Next, as shown in FIG. 10, the SPR 50 is disposed to face the die 101 with both of the target members 61 and 62 interposed therebetween. Specifically, the die 101 is arranged across the stack of the plurality of (two in this embodiment) target members 60 from the SPR 50 to be driven into the target members 60. At this time, as shown in FIG. 10, the protrusion 140 of the die 101 comes to a position corresponding to the leg 52 of the SPR 50. Actually, the rivet joining apparatus is provided with guides which position the die 101 and the SPR 50, and guides the SPR 50 to move in a suitable direction. Thus, when the die 101 and the SPR 50 are arranged in accordance with the guides, the positional relationship shown in FIG. 10 can be automatically established.

Figure 11:
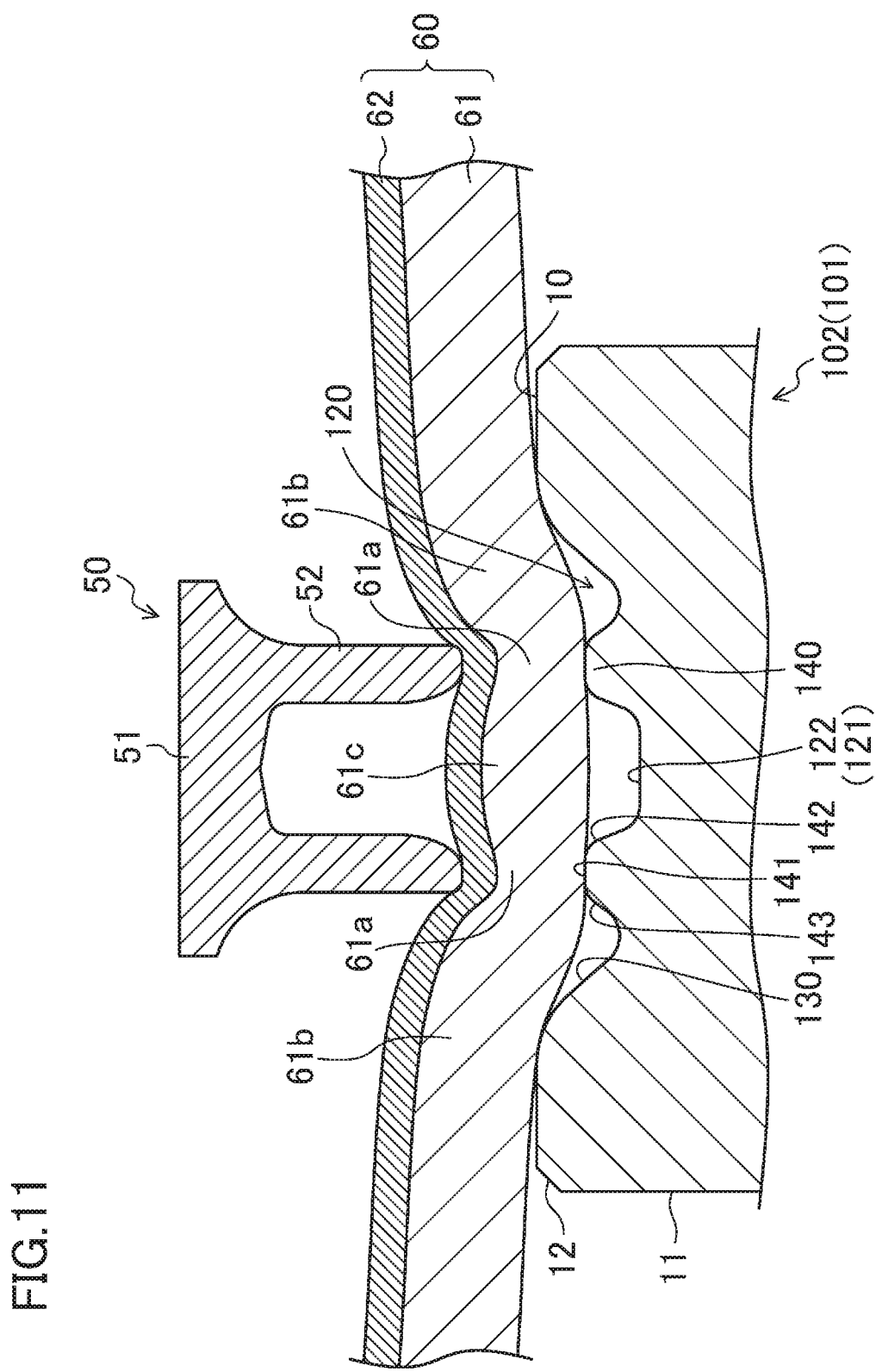
FIG. 11 is a view corresponding to FIG. 6, illustrating the rivet joining die of the second embodiment.

When the SPR 50 is driven toward the die 101 from the state shown in FIG. 10, the two target members 61 and 62 are deformed to bulge toward the inside of the cavity 20 as shown in FIG. 11. At this time, the leg-associated portion 61a of the die-side target member 61 is deformed to stretch outward in the radial direction of the cavity bottom surface 121. The inner deformation portion 61c of the die-side target member 61 is also deformed to stretch outward in the radial direction as the leg-associated portion 61a is. The outer deformation portion 61b of the die-side target member 61 is bent downward.

Further, as shown in FIG. 11, the leg-associated portion 61a of the die-side target member 61 makes contact with the tip end face 141 of the protrusion 140 of the cavity bottom surface 121, while the outer and inner deformation portions 61b and 61c of the die-side target member 61 do not make contact with the cavity bottom surface 121 and the cavity side surface 130. That is, gaps are formed between the die-side target member 61 and the center bottom portion 122, between the die-side target member 61 and the outer bottom portion 123, and between the die-side target member 61 and the cavity side surface 130.

Figure 12:
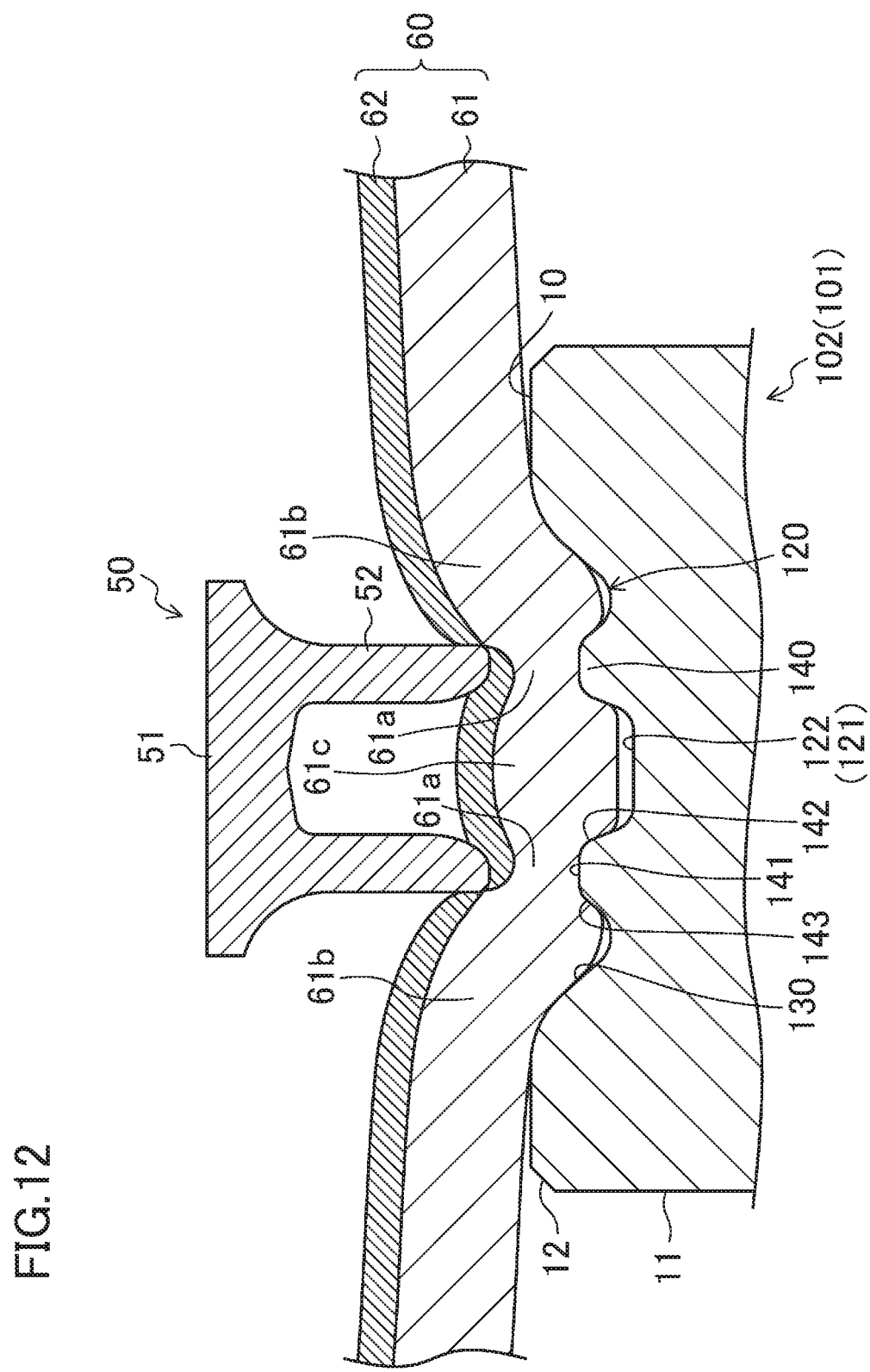
FIG. 12 is a view corresponding to FIG. 7, illustrating the rivet joining die of the second embodiment.

When the SPR 50 is further driven toward the die 101 from the state shown in FIG. 11, the leg 52 of the SPR 50 breaks the rivet-side target member 62 as shown in FIG. 12. The die-side target member 61 is deformed to bulge further toward the inside of the cavity 120. At this time, the leg-associated portion 61a of the die-side target member 61 is deformed to stretch inward and outward in the radial direction. This is because the gaps allow the leg-associated portion 61a to be deformed. The inner deformation portion 61c of the die-side target member 61 moves to be extruded toward the center bottom portion 122 along with the stretching deformation of the leg-associated portion 61a. Further, the outer deformation portion 61b of the die-side target member 61 is bent downward toward the outer bottom portion 123 and the cavity side surface 130 along with the stretching deformation of the leg-associated portion 61a.

Figure 13:
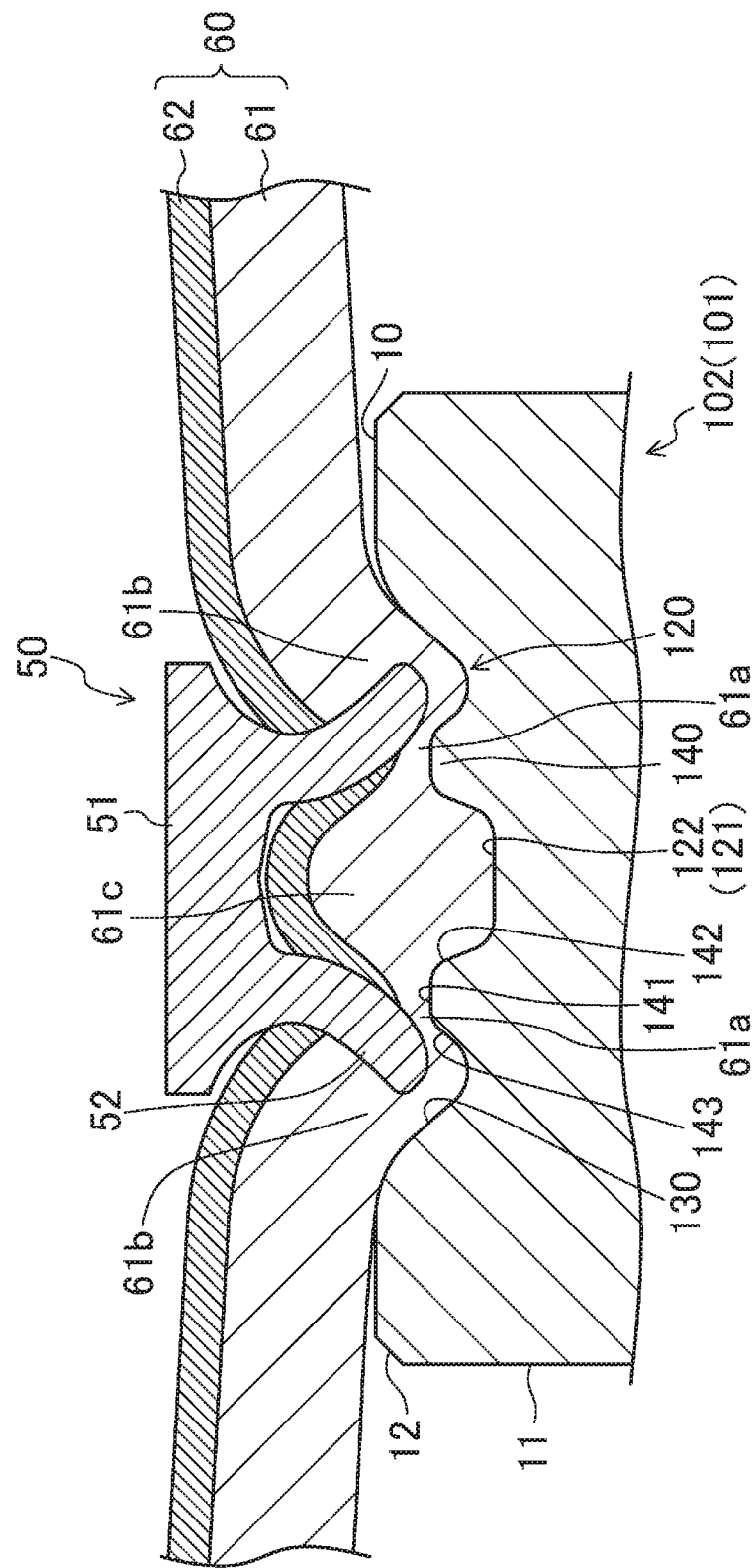
FIG. 13 is a view corresponding to FIG. 8, illustrating the rivet joining die of the second embodiment.

When the SPR 50 is further driven toward the die 101 from the state shown in FIG. 12, the leg 52 of the SPR 50 is deformed to flare outward in the radial direction by a repulsive load from the die 101, and bites into the die-side target member 61 as shown in FIG. 13. At this time, the outer deformation portion 61b of the die-side target member 61 is further bent downward, and is slightly extruded outward in the radial direction due to the biting of the leg 52. The leg-associated portion 61a of the die-side target member 61 is pushed by the leg 52 to move inward in the radial direction. The inner deformation portion 61c of the die-side target member 61 further moves toward the center bottom portion 122 along with the movement of the leg-associated portion 61a, and makes contact with the center bottom portion 122. Then, as shown in FIG. 13, when the SPR 50 is driven into the target members 61 and 62 to such an extent that the leg 52 of the SPR 50 is embedded in both of the target members 61 and 62, the SPR 50 finishes the joining of the rivet-side target member 62 and the die-side target member 61.

In this way, the rivet-side target member 62 and the die-side target member 61 are joined together with the SPR 50. According to the die 101 of the second embodiment, when the leg-associated portion 61a of the die-side target member 61 makes contact with the tip end face 141, gaps that allow the leg-associated portion 61a to be deformed are formed on the inner and outer sides of the protrusion 140 in the radial direction. Thus, when the SPR 50 is used to join the plurality of target members 60 together, restraint to the deformation of the die-side target member 61 can be reduced as much as possible, which can substantially block the die-side target member 61 from cracking, in the same manner as in the first embodiment.

The depth D2 of the cavity 120 at the center bottom portion 122 is greater than the depth D3 of the cavity 120 at the deepest position of the outer bottom portion 123. Therefore, the gap as large as possible can be formed between the center bottom portion 122 and the die-side target member 61 when the leg-associated portion 61a of the die-side target member 61 makes contact with the protrusion 140. This allows the leg-associated portion 61a of the die-side target member 61 to be easily deformed. Further, when the leg 52 of the SPR 50 is deformed to flare, the die-side target member 61 easily moves inward of the protrusion 140 in the radial direction. This allows the leg 52 of the SPR 50 to be suitably deformed, and can ensure an appropriate bond strength between the plurality of target members 60. Note that the depth D2 of the cavity 120 at the center bottom portion 122 is set such that the inner deformation portion 61c of the die-side target member 61 makes contact with the center bottom portion 122 when the SPR 50 finishes the joining of the plurality of target members 60.

Third Embodiment

Figure 14:
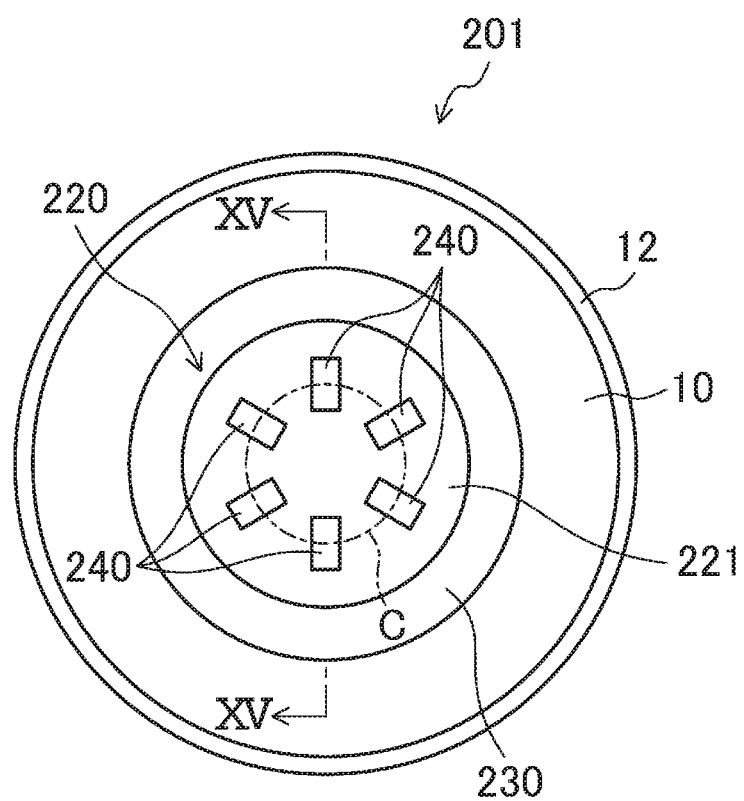
FIG. 14 is a view corresponding to FIG. 2, illustrating a rivet joining die of a third embodiment.
Figure 15:
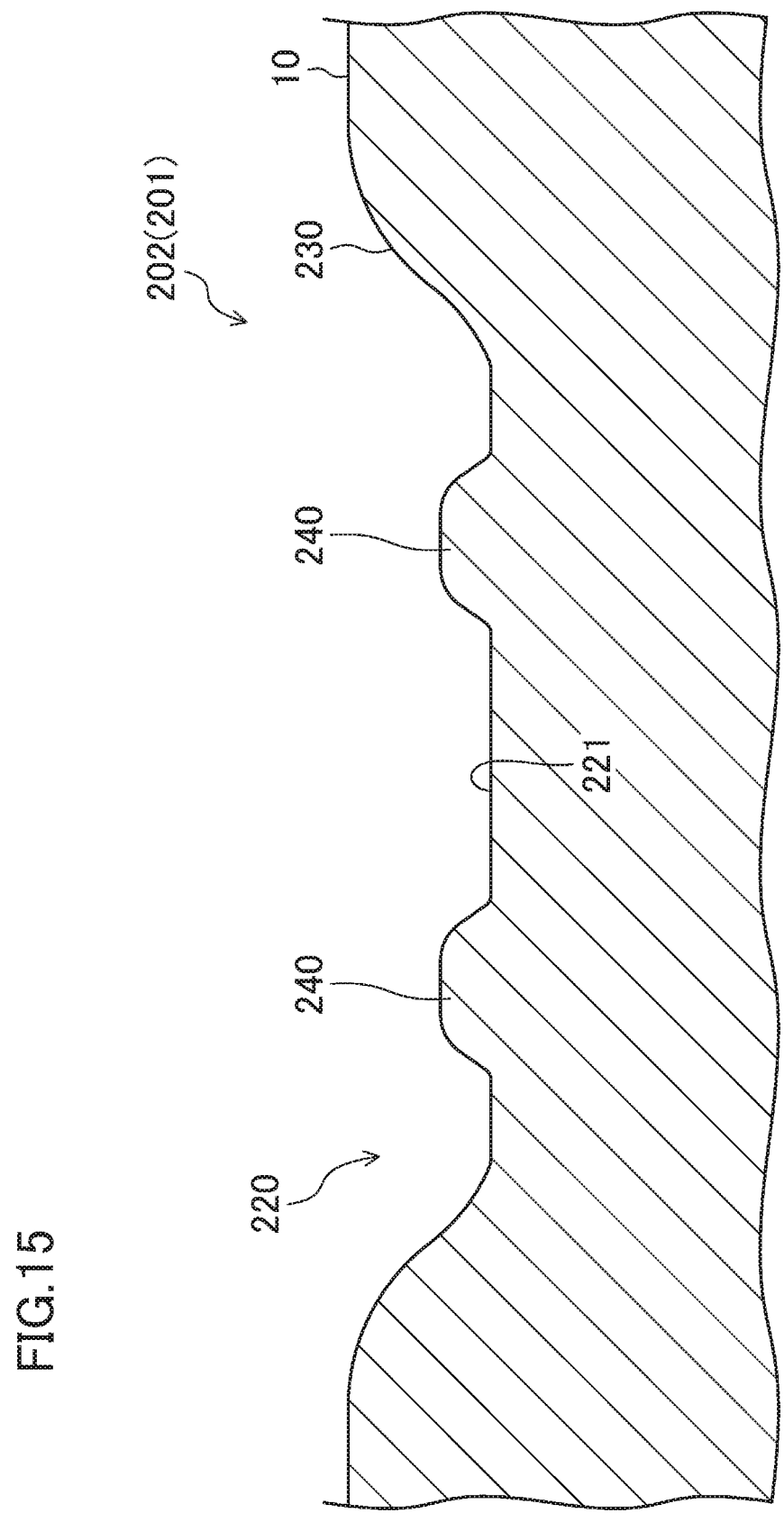
FIG. 15 is a cross-sectional view taken along line XV-XV shown in FIG. 14 illustrating an enlargement of a portion around a cavity in a die body.

FIGS. 14 and 15 show a die body 202 of a rivet joining die 201 according to a third embodiment (hereinafter referred to as a "die 201"). In FIGS. 14 and 15, the same reference characters designate portions common with those of the first embodiment. In the following description, the portions common with those of the first embodiment are not described in detail.

In the third embodiment, a cavity 220 has a cavity bottom surface 221 and a protrusion 240 having the shapes different from those of the first embodiment.

Specifically, in the third embodiment, as shown in FIG. 14, the protrusion 240 includes two or more (six in the third embodiment) protrusions 240 arranged intermittently in the circumferential direction around the center of the cavity bottom surface 221. More specifically, the protrusions 240 are intermittently formed on the imaginary circle C.

Further, in the third embodiment, a portion of the cavity bottom surface 221 radially outward of the protrusion 240 (a portion corresponding to the outer bottom portion of the first and second embodiments) is not curved downward, but is flat as shown in FIG. 15.

Even in the configuration of the third embodiment, when the SPR 50 is driven into the plurality of target members 60 and the leg-associated portion 61a of the die-side target member 61 makes contact with the protrusions 240, gaps that allow the leg-associated portion 61a of the die-side target member 61 to be deformed are formed between the die-side target member 61 and a portion of the cavity bottom surface 221 inward of the protrusions 240 in the radial direction, between the die-side target member 61 and a portion of the cavity bottom surface 221 outward of the protrusions 240 in the radial direction, and between the die-side target member 61 and the cavity side surface 30. This can provide the advantages similar to those of the first embodiment.

Further, in the configuration of the third embodiment, a gap that allows the leg-associated portion 61a of the die-side target member 61 to be deformed can also be formed between a pair of protrusions 240 adjacent to each other in the circumferential direction of the imaginary circle C. This can substantially block the die-side target member 61 from cracking more effectively.

In FIG. 14, the protrusions 240 are arranged at equal intervals in the circumferential direction of the imaginary circle C, but the protrusions 240 are not necessarily arranged at equal intervals in the circumferential direction. However, from the viewpoint of allowing the leg-associated portion 61a of the die-side target member 61 to be deformed as uniformly as possible, the projections 240 are preferably arranged at equal intervals in the circumferential direction. The number of protrusions 240 may be five or less, or seven or more, as long as the die-side target member 61 can be substantially blocked from cracking.

Fourth Embodiment

Figure 16:
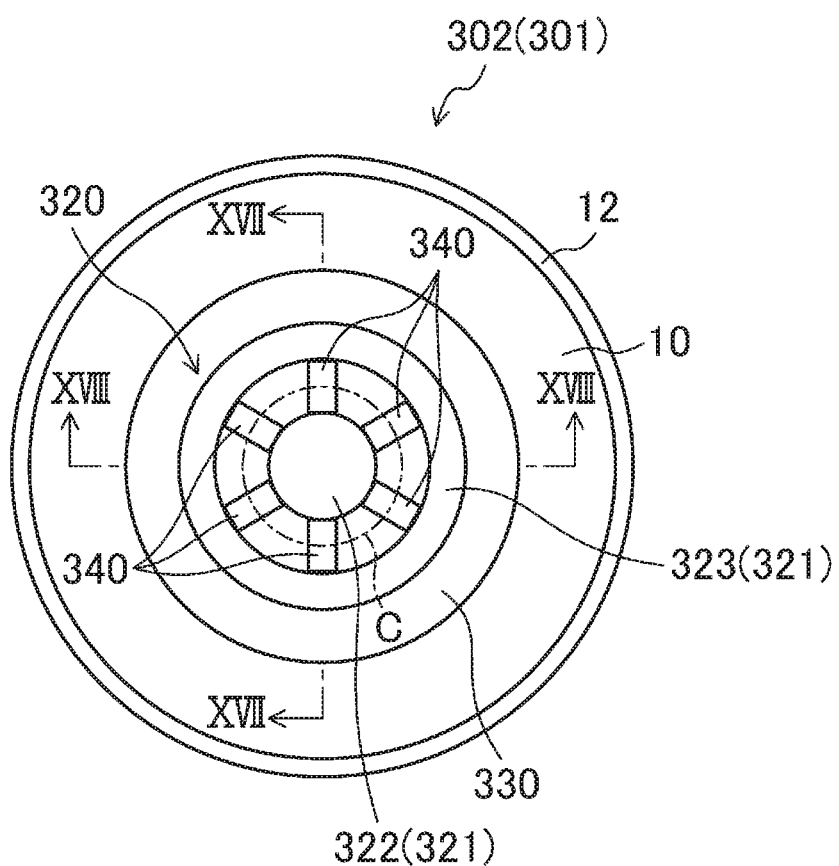
FIG. 16 is a view corresponding to FIG. 2, illustrating a rivet joining die of a fourth embodiment.
Figure 17:
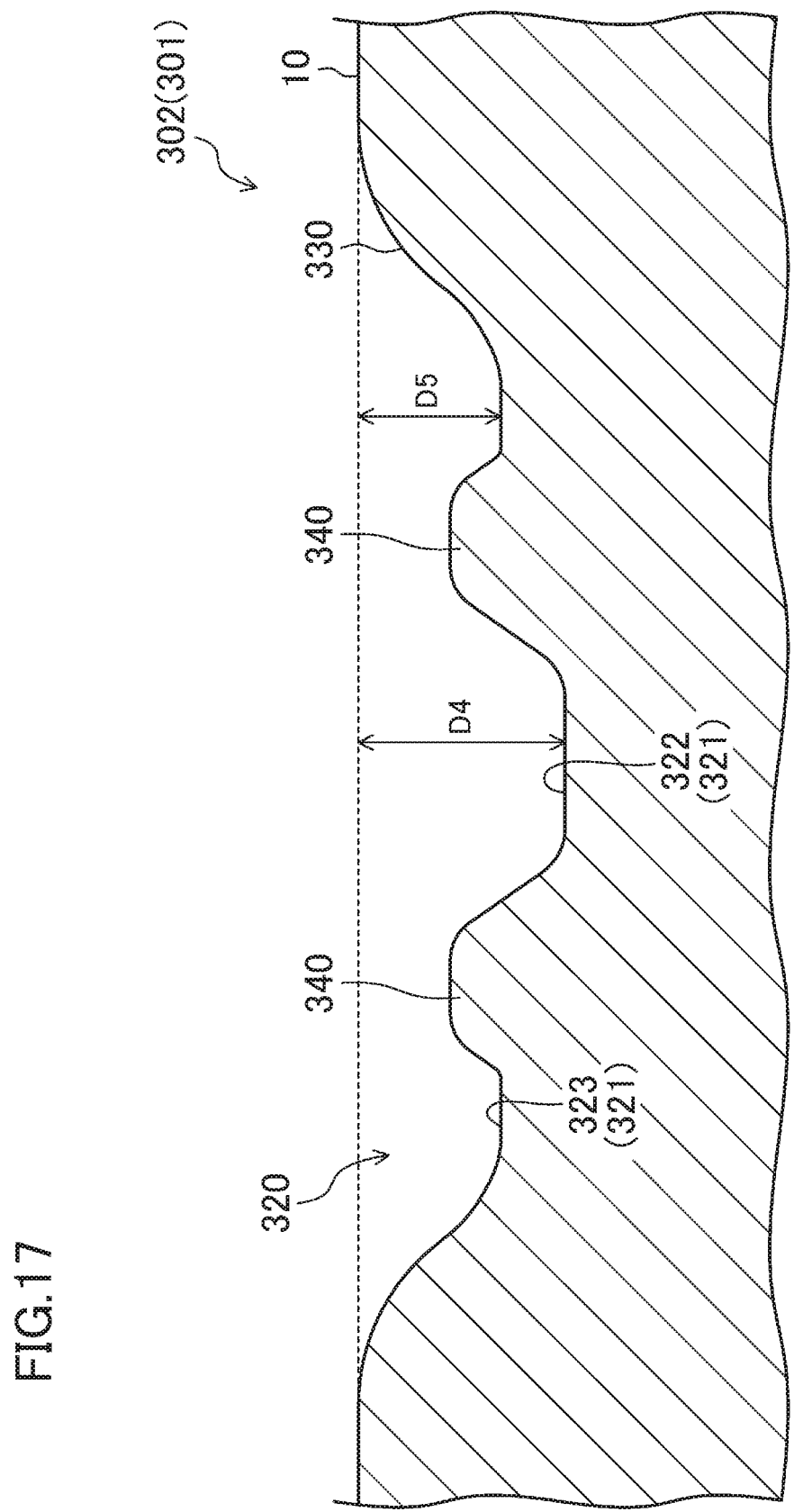
FIG. 17 is a cross-sectional view taken along line XVII-XVII shown in FIG. 16 illustrating an enlargement of a portion around a cavity in a die body.
Figure 18:
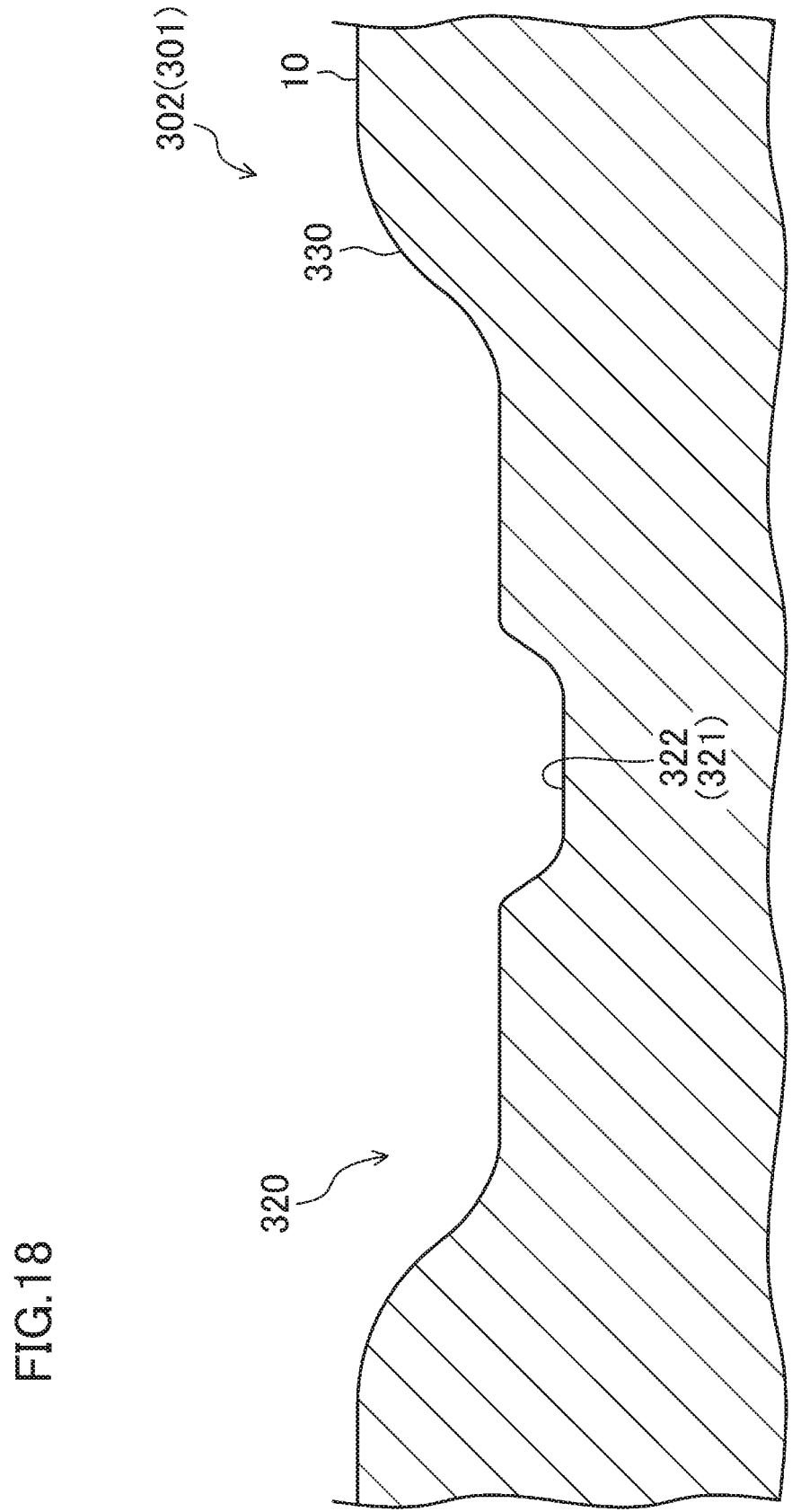
FIG. 18 is a cross-sectional view taken along line XVIII-XVIII shown in FIG. 16 illustrating an enlargement of a portion around a cavity in a die body.

FIGS. 16 to 18 show a rivet joining die 301 of a fourth embodiment (hereinafter referred to as a "die 301"). In FIGS. 16 to 18, the same reference characters designate portions common with those of the first embodiment. In the following description, the portions common with those of the first embodiment are not described in detail.

In the fourth embodiment, a cavity 320 has a cavity bottom surface 321 and a protrusion 340 having the shapes different from those of the first and second embodiments.

Specifically, in the fourth embodiment, as shown in FIG. 16, the protrusion 340 includes two or more (six in the third embodiment) protrusions 340 arranged intermittently in the circumferential direction around the center of the cavity bottom surface 321. More specifically, the protrusions 340 are intermittently formed on the imaginary circle C.

In the fourth embodiment, an outer bottom portion 323 of the cavity bottom surface 321 is not curved downward, but is flat as shown in FIGS. 17 and 18. The center bottom portion 322 of the cavity bottom surface 321 is flat in the same manner as in the first to third embodiments. Further, as shown in FIG. 18, a portion of the cavity bottom surface 321 located between a pair of protrusions 340 adjacent to each other in the circumferential direction around the center of the cavity bottom surface 321 is a flat surface continuous with the outer bottom portion 323.

In the fourth embodiment, similarly to the second embodiment, the depth D4 of the cavity 320 at the center bottom portion 322 is greater than the depth D5 of the cavity 120 at the deepest position of the outer bottom portion 323.

Even in the configuration of the fourth embodiment, when the SPR 50 is driven toward the die 301 into the plurality of target members 60 and the leg-associated portion 61a of the die-side target member 61 makes contact with the protrusions 340, gaps that allow the leg-associated portion 61a to be deformed are formed between the die-side target member 61 and the center bottom portion 322, between the die-side target member 61 and the outer bottom portion 323, and between the die-side target member 61 and the cavity side surface 30. This can provide the advantages similar to those of the first embodiment.

In the configuration of the fourth embodiment, a gap that allows the leg-associated portion 61a of the die-side target member 61 to be deformed can also be formed between a pair of protrusions 340 adjacent to each other in the circumferential direction of the imaginary circle C. This can substantially block the die-side target member 61 from cracking more effectively.

Further, in the fourth embodiment, the depth D4 of the cavity 320 at the center bottom portion 322 is greater than the depth D5 of the cavity 120 at the deepest position of the outer bottom portion 323. This allows the leg-associated portion 61a of the die-side target member 61 to be deformed easily in the same manner as in the second embodiment. Similarly to the second embodiment, when the leg 52 of the SPR 50 is deformed to flare, the die-side target member 61 easily moves inward of the protrusions 340 in the radial direction. This allows the leg 52 of the SPR 50 to be suitably deformed, and can ensure an appropriate bond strength between the plurality of target members 60.

In FIG. 16, the protrusions 340 are arranged at equal intervals in the circumferential direction of the imaginary circle C, but the protrusions 3240 are not necessarily arranged at equal intervals in the circumferential direction. However, from the viewpoint of allowing the leg-associated portion 61a and outer and inner deformation portions 61b and 61c of the die-side target member 61 to be deformed as uniformly as possible, the projections 340 are preferably arranged at equal intervals in the circumferential direction. The number of protrusions 340 may be five or less, or seven or more, as long as the die-side target member 61 can be substantially blocked from cracking.

Other Embodiments

The disclosed rivet joining die is not limited to the embodiments described above. Any substitution can be made within the scope of the claims as appropriate.

For example, it has been described in the above embodiments that the two target members 60 are joined together, but the present invention is not limited thereto. The disclosed rivet joining die 1 (101, 201, 301) may also be used when three or more target members 60 are joined together.

In the first and second embodiments, the protrusion 40 (140, 240, 340) is formed in an annular shape extending continuously in the entire circumferential direction of the imaginary circle C, but the present invention is not limited thereto. The protrusion may have a C-shape continuously extending along part of the imaginary circle C in the circumferential direction.

Further, in the first to fourth embodiments described above, the height of the protrusion 40 (140, 240, 340) from the deepest position of the cavity 20 (120, 220, 320) is set to be greater than 30% of the depth of the cavity 20 (120, 220, 320) at the deepest position of the cavity 20 (120, 220, 320), but the present invention is not limited thereto. The height of the protrusion 40 (140, 240, 340) from the deepest position of the cavity 20 (120, 220, 320) may be 30% or less of the depth of the cavity 20 (120, 220, 320) at the deepest position of the cavity 20 (120, 220, 320). If the height of the protrusion 40 (140, 240, 340) from the deepest position of the cavity 20 (120, 220, 320) is too small, sufficient gaps are not formed between the die-side target member 61 and the cavity bottom surface 21 (121, 221, 321) when the die-side target member 61 makes contact with the tip end face of the protrusion 40 (140, 240, 340). Therefore, in a preferred embodiment, the height of the protrusion 40 (140, 240, 340) from the deepest position of the cavity 20 (120, 220, 320) is at least 25% or more of the depth of the cavity 20 (120, 220, 320) at the deepest position of the cavity 20 (120, 220, 320).

In the first and second embodiments, the curved portion 23a (123a) is provided for the outer bottom portion 23 (123), but the curved portion 23a (123a) is not essential.

In the first to fourth embodiments, the die body 2 (102, 202, 302) is columnar in shape, but the present invention is not limited thereto. The die body 2 may have a prismatic shape as long as the cavity 20 (120, 220, 320) which is circular when viewed from the axial direction is formed.

In the first to fourth embodiments, the tip end face 41 (141) is configured as a flat surface extending in a direction orthogonal to the axial direction of the die body 2 (102, 202, 302), but the present invention is not limited thereto. The tip end face 41 may be slightly inclined upward toward the inside or outside in the radial direction as long as the die-side target member 61 can be substantially blocked from cracking.

The foregoing embodiments are merely examples in nature, and the scope of the present disclosure should not be interpreted in a limited manner. The scope of the present disclosure is defined by the appended claims, and all variations and modifications belonging to a range equivalent to the range of the claims are within the scope of the technique disclosed in this specification.

INDUSTRIAL APPLICABILITY

The present disclosure is useful as a rivet joining die used for joining a plurality of target members together with a self-piercing rivet.

DESCRIPTION OF REFERENCE CHARACTERS

1, 101, 201, 301 Rivet Joining Die
2, 102, 202, 302 Die Body
10 Upper Surface (End Face Facing One Side in Axial Direction of Die Body)
20, 120, 220, 320 Cavity
21, 121, 221, 321 Cavity Bottom Surface
22, 122, 322 Center Bottom Portion
23, 123, 323 Outer Bottom Portion
23a, 123a Curved Portion
30, 130, 230, 330 Cavity Side Surface
33 Inclined Flat Portion (Flat Portion of Cavity Side Surface)
40, 140, 240, 340 Protrusion
41, 141 Tip End Face
50 Self-Piercing Rivet
52 Leg
60 Target Member
61 Die-Side Target Member
132 Lower Side Surface Portion (Flat Portion of Cavity Side Surface)
C Imaginary Circle
D1 Depth of Cavity at Deepest Position of Cavity
D2, D4 Depth of Cavity at Center Bottom Portion
D3, D5 Depth of Cavity at Outer Bottom Portion
Di1, Di3 Diameter of Cavity at Open End
Di2, Di4 Diameter of Cavity Bottom Surface
H1, H2 Height of Protrusion from Deepest Position of Cavity
W1, W2 Predetermined Width of Tip End Face

The invention claimed is:

1. A rivet joining die configured to be arranged across a stack of a plurality of target members from a self-piercing rivet which has a substantially cylindrical leg and which is to be driven into the stack of the target members when joining the target members, the rivet joining die comprising:
  a columnar die body, an end face of which faces one side in an axial direction thereof and is configured to be brought into contact with a die-side target member which is one of the target members closest to the die, wherein
  the die body has a cavity formed in the end face facing the one side in the axial direction except for an outer peripheral portion of the end face, the cavity being circular when viewed from the axial direction, and being recessed from the end face toward an other side in the axial direction to allow the die-side target member to be deformed to bulge toward the other side in the axial direction when the self-piercing rivet is driven into the target members,
  the cavity is defined by a cavity bottom surface which is circular when viewed from the axial direction, and a cavity side surface which has a flat portion,
  an annular protrusion jutting toward the one side in the axial direction is formed on an imaginary circle on the cavity bottom surface, the imaginary circle having a diameter which is a mean diameter of an inner diameter and outer diameter of the leg of the self-piercing rivet, and being concentric with the cavity bottom surface, the protrusion includes a single protrusion continuously extending on the imaginary circle, or two or more protrusions intermittently formed on the imaginary circle, the single protrusion or each of the two or more protrusions has a tip end face extending in a direction substantially orthogonal to the axial direction and having a predetermined width in a radial direction defined between an inner radius and an outer radius of the annular protrusion, and in a cross section of the die body taken along a plane passing a center of the cavity bottom surface and extending in the axial direction, the predetermined width in the radial direction of the tip end face is set to be 10% or more of a diameter of the cavity at an open end thereof, the diameter of the cavity being defined by a length between two points of intersection between two straight lines respectively extending toward the one side in the axial direction along flat portions of two cavity side surfaces located on both sides in the radial direction and a straight line extending in the radial direction along the end face of the die body facing the one side in the axial direction.

2. The rivet joining die of claim 1, wherein a height of the protrusion from a deepest position of the cavity is greater than 30% of a depth of the cavity at the deepest position of the cavity.

3. The rivet joining die of claim 2, wherein the protrusion includes two or more protrusions intermittently formed on the imaginary circle, and the two or more protrusions are arranged at equal intervals in the circumferential direction of the imaginary circle.

4. The rivet joining die of claim 2, wherein a diameter of the cavity bottom surface is smaller than the diameter of the cavity at the open end thereof, the cavity side surface is inclined outward in the radial direction toward the one side in the axial direction, and the flat portion of the cavity side surface is an inclined flat surface.

5. The rivet joining die of claim 1, wherein the cavity bottom surface has a center bottom portion located inward of the protrusion in the radial direction, and an outer bottom portion located outward of the protrusion in the radial direction, and the cavity has a greater depth at the center bottom portion than at the outer bottom portion.

6. The rivet joining die of claim 1, wherein the cavity bottom surface has a center bottom portion located inward of the protrusion in the radial direction, and an outer bottom portion located outward of the protrusion in the radial direction, and the outer bottom portion includes a curved portion which is curved so that a middle portion thereof in the radial direction is located further toward the other side in the axial direction than end portions thereof in the radial direction.

7. The rivet joining die of claim 1, wherein the protrusion is formed in an annular shape extending continuously in an entire circumferential direction of the imaginary circle.

* * * * *